(12) United States Patent
Dharssi et al.

(10) Patent No.: US 9,711,182 B2
(45) Date of Patent: Jul. 18, 2017

(54) SYSTEM AND METHOD FOR IDENTIFYING AND ALTERING IMAGES IN A DIGITAL VIDEO

(75) Inventors: Fatehali T. Dharssi, Vancouver (CA); Ashley McKay, Vancouver (CA)

(73) Assignee: In Situ Media Corporation, Vancouver (CA)

( * ) Notice: Subject to any disclaimer, the term of this patent is extended or adjusted under 35 U.S.C. 154(b) by 637 days.

(21) Appl. No.: 14/124,588

(22) PCT Filed: Jun. 7, 2012

(86) PCT No.: PCT/CA2012/000558
§ 371 (c)(1),
(2), (4) Date: Jul. 15, 2014

(87) PCT Pub. No.: WO2012/167365
PCT Pub. Date: Dec. 13, 2012

(65) Prior Publication Data
US 2014/0363143 A1  Dec. 11, 2014

Related U.S. Application Data

(60) Provisional application No. 61/494,348, filed on Jun. 7, 2011.

(51) Int. Cl.
*G11B 27/036* (2006.01)
*H04N 5/272* (2006.01)
*G06Q 30/02* (2012.01)
*G06K 9/00* (2006.01)
*G06K 9/46* (2006.01)
*G06K 9/48* (2006.01)
*G06K 9/62* (2006.01)
(Continued)

(52) U.S. Cl.
CPC ........ *G11B 27/036* (2013.01); *G06K 9/00765* (2013.01); *G06K 9/4652* (2013.01); *G06K 9/48* (2013.01); *G06K 9/6202* (2013.01); *G06Q 30/0254* (2013.01); *H04N 5/272* (2013.01); *H04N 21/23412* (2013.01); *H04N 21/812* (2013.01); *H04N 21/854* (2013.01); *G06K 9/72* (2013.01); *G06K 2209/17* (2013.01)

(58) Field of Classification Search
CPC .............. H04N 5/367; H04N 13/0422; H04N 13/0257; H04N 1/60; H04N 19/115; H04N 19/169; H04N 19/537
See application file for complete search history.

(56) References Cited

U.S. PATENT DOCUMENTS 6,724,915 B1   4/2004   Toklu et al.
6,924,832 B1   8/2005   Shiffer et al.
(Continued)

FOREIGN PATENT DOCUMENTS

EP    1 150 505 A1   10/2001

OTHER PUBLICATIONS

International Search Report, mailed Sep. 18, 2012, for PCT/CA2012/000558, 3 pages.
(Continued)

*Primary Examiner* — Hung Dang
*Assistant Examiner* — Sunghyoun Park

(57) ABSTRACT

A method of identifying distinctive objects or images within a digital video comprises the use of one or more pixel (pel) based "pattern" or "feature" recognition protocols.

6 Claims, 8 Drawing Sheets

(51) Int. Cl.
*H04N 21/234* (2011.01)
*H04N 21/81* (2011.01)
*H04N 21/854* (2011.01)
*G06K 9/72* (2006.01)

(56) References Cited

U.S. PATENT DOCUMENTS

| | | | |
|---|---|---|---|
| 6,944,331 | B2 | 9/2005 | Schmidt et al. |
| 7,227,893 | B1 | 6/2007 | Srinivasa et al. |
| 7,334,249 | B1 | 2/2008 | Byers |
| 2001/0026616 | A1 | 10/2001 | Tanaka |
| 2002/0004819 | A1 | 1/2002 | Agassy et al. |
| 2002/0090110 | A1 | 7/2002 | Braudaway et al. |
| 2005/0025357 | A1 | 2/2005 | Landwehr et al. |
| 2005/0140788 | A1 | 6/2005 | Fox et al. |
| 2006/0025998 | A1* | 2/2006 | Sakai ............. H04N 7/147 704/260 |
| 2007/0172122 | A1* | 7/2007 | Kouno ............ G06K 9/2063 382/175 |
| 2008/0019560 | A1 | 1/2008 | Rhoads |
| 2008/0063279 | A1 | 3/2008 | Vincent et al. |
| 2008/0130948 | A1 | 6/2008 | Ozer |
| 2008/0301224 | A1 | 12/2008 | Papageorgiou |
| 2009/0238460 | A1 | 9/2009 | Funayama et al. |
| 2009/0278937 | A1 | 11/2009 | Botchen et al. |
| 2009/0300480 | A1 | 12/2009 | Cohen et al. |
| 2010/0257551 | A1* | 10/2010 | Sweeney .......... H04N 7/165 725/34 |
| 2011/0170772 | A1 | 7/2011 | Dharssi |
| 2011/0267538 | A1 | 11/2011 | Dharssi |
| 2012/0310773 | A1* | 12/2012 | Masuko ........... G06Q 30/00 705/26.8 |
| 2013/0243394 | A1 | 9/2013 | Dharssi |

OTHER PUBLICATIONS

Cortes et al., "Support-Vector Networks," *Machine Learning* 20:273-297, 1995.

Duda et al., "Use of the Hough Transformation to Detect Lines and Curves in Pictures," *Graphics and Image Processing*, W. Newman, editor, pp. 11-15, 1972.

Friedman, W., "Virtual Placement Gets Second Chance," URL=http://adage.com/print/101981, Feb. 14, 2005, 2 pages.

Johannes, A., "TV Placements Overtake Film," URL=http://www.chiefmarketer.com/special-reports-chief-marketer/tv-placements-overtake-film . . . , May 1, 2005, 3 pages.

Lowe, D., "Object Recognition from Local Scale-Invariant Features," *Proc. of the International Conference on Computer Vision*, Corfu, Sep. 1999, 8 pages.

Viola, P., "Robust Real-Time Object Detection," Compaq, Cambridge Research Laboratory, Technical Report Series, CRL 2001/01, Feb. 2001, 30 pages.

"5.5 Conversion to Grayscale," URL=http://gimp-savvy.com/BOOK/node54.html, retrieved Mar. 13, 2014, 4 pages.

Dharssi, "System and Method for Altering Images in a Digital Video," Office Action mailed Feb. 26, 2013, for U.S. Appl. No. 12/684,758, 11 pages.

Dharssi, "System and Method for Altering Images in a Digital Video," Amendment filed Aug. 26, 2013, for U.S. Appl. No. 12/684,758, 14 pages.

Dharssi, "System and Method for Altering Images in a Digital Video," Final Office Action mailed Nov. 7, 2013, for U.S. Appl. No. 12/684,758, 12 pages.

Dharssi, "System and Method for Altering Images in a Video File Using Predetermined Parameters," Office Action mailed Jul. 2, 2012, for U.S. Appl. No. 12/770,101, 12 pages.

\* cited by examiner

US 9,711,182 B2

SYSTEM AND METHOD FOR IDENTIFYING AND ALTERING IMAGES IN A DIGITAL VIDEO

FIELD OF THE INVENTION

This invention relates to digital video, such as that available via the Internet, and more particularly to altering and substituting images in such digitized videos.

BACKGROUND

Advertising in video, such as a television (TV) program, is primarily accomplished by either placing a conventional advertisement in commercial breaks during the display of the TV program (which is an explicit means of advertising) or, by placing a product in the scenes of the video in which the product appears as "naturally" part of the scene, and is not being explicitly advertised (this form of advertising is known as "implicit advertising"). As advertising becomes more cluttered on TV and on the Internet, and with the increasing ability of video viewers (i.e. intended consumers of the advertisers) to avoid such advertising using digital video recorders (DVRs) and other means, the demand for implicit advertising continues to grow.

The market for implicit advertising has been valued at over $4 billion in 2005, and has been growing at over 20% per year. Today, product placements appear in TV shows, films, video games, and new media such as the online virtual world known as Second Life.

Typically, products placed in videos as implicit advertising are placed when the video is filmed or made. Another method adds a flash movie layer to a streaming video format to provide interactivity to the video, thereby allowing users to scroll over or click on elements within the video to obtain more information. Once the video is released for viewing, there lacks a means to identify, locate, replace, supplement or otherwise alter the original product placed in the streaming video.

With the prevalence of videos (particularly those posted on the web via sites such as YouTube®), it is considered desirable and useful to be able to manipulate digital images after creation/production. There are various reasons for this. Realistic content modification can change a scene context, offer product placement, offer advertising and adapt content aesthetics based on user preferences.

Specifically with regard to digital product placement, there is a huge demand for replacement of products or insertion de novo of products into appropriate scenes. Since the inception of TiVo in 1997, digital video recorders (DVRs) have quickly become a staple in many households. One significant reason consumers prefer this technology is because it gives them the ability to skip commercials that appeared in a show's original broadcast. Complementing this trend, viewers can now watch many of their favorite television shows online or, in the alternative, download commercial-free episodes onto their computers or portable media players (e.g., iPods® or even cell phones) for a small charge.[1]

[1] See, for example Apple-iTunes, http://www.apple.com/itunes/store/tvshow-shtml (providing instructions on how to download TV shows onto iTunes, for viewing on a computer, or uploading onto a portable media device such as an iPod)

Such digital advances do not solely impact television viewers. Due to the increased use of this commercial-skipping technology, advertisers have had to find new ways beyond the traditional thirty-second commercial to get their messages out. Strategic product placement has been a welcome replacement. A market research firm found that the value of television product placement jumped 46.4% to $1.87 billion in 2004, and predicted (correctly) that the trend will likely continue due to the "growing use of [DVRs] and larger placement deals as marketers move from traditional advertising to alternative media.[3]

[3] See Johannes, TV Placements Overtake Film, supra note 15 (quoting a marketing association president as saying "product placement is the biggest thing to hit the advertising industry in years," and noting that PQ Media predicts the value of product placement will grow at a compound rate of 14.9% to reach $6.94 billion by 2009).

Although product placement has been around in some form for years, the new focus on merchandising is via digital product placement or replacement. Digital product placement occurs when advertisers insert images of products into video files after they have already been created. For example, such technology has been used for years to superimpose a yellow first-down line into football broadcasts or to insert product logos behind home plate during televised baseball games.[4]

[4] See Wayne Friedman, Virtual Placement Gets Second Chance, ADVERTISING AGE, Feb. 14, 2005, at 67 (discussing efforts to incorporate digital product placement into television).

Within the digital video space, internet based video has continued to become a rapidly growing source of published content. The publishing sources include movies and TV programs, and are often streamed or downloaded over a network as digital data. Accordingly, on-line videos of the type available on services such as YouTube® have become a source of live music, comedy, education and sports programming. These videos are usually sent digitally to a viewer's computer, an "intelligent" TV, or a mobile computing device.

As online video viewing has become very prominent on the global Internet, the need to advertise in this medium has also gained popularity. Promotional content delivery methods offered with and around transmitted Internet videos is widely sought by numerous progressive advertisers—both to supplement and complement traditional advertising on television, radio and print media. Such advertisers are constantly seeking advertising that is targeted based on viewer's demographic, purchase behavior, attitudinal and associated data. Accordingly, some advertisers prefer to understand the context of online videos in order to improve advertising content relevance. Some examples of reasons to perform detailed scene-by-scene video content analysis include:

a) To subtly place products in the background of video scenes for viewers to notice, one would need to know the detailed scene content layout for appropriate product location placement. As an example, if a brand wished to advertise prior to a user requested video being shown the viewer (popularly known in the industry as Pre-Roll ads), or as a banner advert at the bottom of the video frame while the video is being played, it is important for the company to know if any competing products are part of existing video scenes to minimize conflicting messages to a viewer.

b) If a company is running Pre-Roll ads it may also wish to place a branded promotional item on a table in the appropriate scenes of videos to increase advertising impact. One may also prefer to place an item as part of the background content if the advertiser prefers a more passive product placement location. To avoid impacting the video scene contextually, the system must account for identifiable items that comprise the scene, and decide if it is appropriate for product placement.

SUMMARY OF THE INVENTION

The present invention provides a method to identify images and/or objects within a digital video file for the purpose of alteration or modification. More specifically, there is provided a method of identifying distinctive objects or images within a digital video using one or more pixel (pel) based "pattern" or "feature" recognition protocols.

The present invention provides, in one aspect, a method for a user to interactively manipulate online digital video file content, comprising the steps of:
(a) providing said user with an interface, said interface providing a plurality of questions answerable by said user, said questions including those relating to one or more characteristics of an image desired to be manipulated (the "desired image");
(b) searching at least one video for the desired image, said searching for the image being based upon at least one type pixel-based "pattern" or "feature" recognition protocols and identifying a proposed image match to the desired image;
(c) statistically verifying that the proposed image is the desired image; and
(d) manipulating the desired image by way of an action selected from the group consisting of: deleting the desired image, replacing all of the desired image with an alternative image, replacing a part of the desired image with an alternative image, adding at least one feature to the desired image, and altering an environment surrounding the desired image.

The present invention provides, in another apsect, a system to manipulate online digtial video file content with respect to an image desired to be manipulated (the "desired image") comprising
a) a first computer requesting the digital video file from a second computer over a network; and
b) at least one of the first or second computers configured to: i) select data representing a set of images within the digital video file; and ii) scan the data for pixel characteristics based upon based upon at least one type of pixel-based "pattern" or "feature" recognition protocol and therafter identifying a proposed image match to the desired image; iii) statistically verify that the proposed image is the desired image; and iv) manipulating the desired image by way of an action selected from the group consisting of: deleting the desired image, replacing all of the desired image with an alternative image, replacing a part of the desired image with an alternative image, adding at least one feature to the desired image, and altering an environment surrounding the desired image.

The present invention further provides a method of tracking and monitoring online digital videos with a demonstrable and high level of popularity (referred to as "viral") which comprises:
(a) providing a user with an interface, said interface providing data to the user relating to at least one viral video;
(b) providing a plurality of questions answerable by said user, said questions including those relating to one or more characteristics of an image desired to be manipulated (the "desired image") with said viral video;
(b) searching a viral video for the desired image, said searching for the image being based upon at least one type pixel-based "pattern" or "feature" recognition protocol and identifying a proposed image match to the desired image;
(c) statistically verifying that the proposed image is the desired image; and
(d) manipulating the desired image by way of an action selected from the group consisting of: deleting the desired image, replacing all of the desired image with an alternative image, replacing a part of the desired image with an alternative image, adding at least one feature to the desired image, and altering an environment surrounding the desired image.

Since digital video is made up of frames comprising pixels of various colors, it is difficult to decipher images. This invention provides methods and systems to identify one or more distinctive images to determine the content and/or context of a scene on a video, and/or to add to, delete or alter such a distinctive image (in whole or part) and/or add to, delete or alter the environment of the distinctive image. One purpose of these methods is to determine the video content and context so as to add, substitute, change product images, as a way of advertising such products, in the video such that it will look like to the viewer that the product was placed when the video was originally produced. For example, with a digital file, an image of a Coke® can may be replaced with an image of a Pepsi® can (first image to second image switch). Equally importantly, one or more distinctive images may be used (not for the purpose of substitution) but to determine "environs" such that another image can be placed therein. For example, as described in further detail below, if the identified distinctive images are a refrigerator, an oven and a counter, a cereal box my be inserted on the counter, although not previously present in the original digital media file. As such, the distinctive images may be "identifiers" for further strategic image placement.

Furthermore, it is to be understood that the foregoing steps of the method and system of the present invention can be performed entirely by a computing system or partly by a computing system and partly under manual human quality control review, direction and instruction.

As described further below, the uses and applications of the method and system of the present invention are numerous. For example, trade-marks in digital video files can be identified not only for the purpose of subsequent alteration, but also possible addition within a desired context or for inventory and quality control. A trade-mark owner may need to inventory its product placements in movies or television shows or it may wish to track and control potentially harmful or offensive use of its trade-marks on internet sites such as YouTube®. With currently available technology, this is difficult and expensive to do.

DETAILED DESCRIPTION OF THE INVENTION

Figure 1:
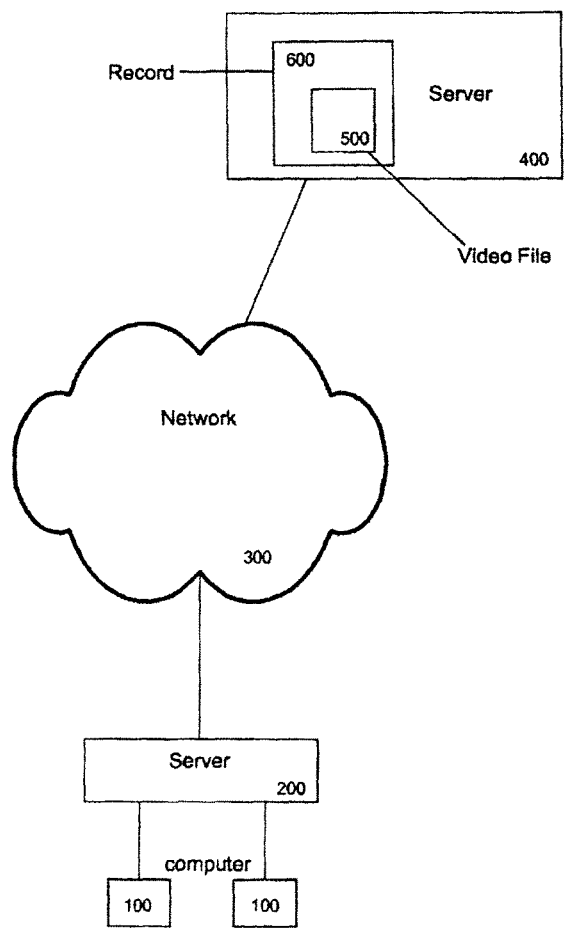
FIG. 1 is a block diagram showing a system wherein the invention may be practiced.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Terms

The term "invention" and the like mean "the one or more inventions disclosed in this application", unless expressly specified otherwise.

The term "user", as described herein refers to at least one of: an advertiser, viewers of online content, video editor, video distributor, video creator, cable TV operator, game players or developers, members of social media sites, and online searchers.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The term a "grayscale" or "greyscale" as used herein with respect to a digital image is an image in which the value of each pixel is a single sample, that is, it carries only intensity information. Images of this sort, also known as black-and-white, are composed exclusively of shades of gray, varying from black at the weakest intensity to white at the strongest. Grayscale images are distinct from one-bit bi-tonal black-and-white images, which in the context of computer imaging are images with only the two colors, black, and white (also called bilevel or binary images). Grayscale images have many shades of gray in between. Grayscale images are also called monochromatic, denoting the presence of only one (mono) color (chrome).

Grayscale images are often the result of measuring the intensity of light at each pixel in a single band of the electromagnetic spectrum (e.g. infrared, visible light, ultra-violet, etc.), and in such cases they are monochromatic proper when only a given frequency is captured. But also they can be synthesized from a full color image. The intensity of a pixel is expressed within a given range between a minimum and a maximum, inclusive. This range is represented in an abstract way as a range from 0 (total absence, black) and 1 (total presence, white), with any fractional values in between. This notation is generally used in academic papers, but it must be noted that this does not define what "black" or "white" is in terms of colorimetry.

Another convention with regard to grayscale images is to employ percentages, so the scale is then from 0% to 100%. This is used for a more intuitive approach, but if only integer values are used, the range encompasses a total of only 101 intensities, which are insufficient to represent a broad gradient of grays. Also, the percentile notation is used in printing to denote how much ink is employed in halftoning, but then the scale is reversed, being 0% the paper white (no ink) and 100% a solid black (full ink).

In computing, although the grayscale can be computed through rational numbers, image pixels are stored in binary, quantized form. Some early grayscale monitors can only show up to sixteen (4-bit) different shades, but today grayscale images (as photographs) intended for visual display (both on screen and printed) are commonly stored with 8 bits per sampled pixel, which allows 256 different intensities (i.e., shades of gray) to be recorded, typically on a non-linear scale. The precision provided by this format is barely sufficient to avoid visible banding artifacts, but very convenient for programming due to the fact that a single pixel then occupies a single byte.

Means for the conversion of a color image to grayscale are known in the art; for example, different weighting of the color channels effectively represent the effect of shooting black-and-white film with different-colored photographic filters on the cameras. A common strategy is to match the luminance of the grayscale image to the luminance of the color image.

To convert any color to a grayscale representation of its luminance, first one must obtain the values of its red, green, and blue (RGB) primaries in linear intensity encoding, by gamma expansion. Then, add together 30% of the red value, 59% of the green value, and 11% of the blue value[5] (these weights depend on the exact choice of the RGB primaries, but are typical). Regardless of the scale employed (0.0 to 1.0, 0 to 255, 0% to 100%, etc.), the resultant number is the desired linear luminance value; it typically needs to be gamma compressed to get back to a conventional grayscale representation. To convert a gray intensity value to RGB, all the three primary color components red, green and blue are simply set to the gray value, correcting to a different gamma if necessary.

[5] http://gimp-savvy.com/BOOK/index.html?node54.html

The main reason why grayscale representations are used for identification instead of operating on color images directly is that grayscale simplifies the identity algorithm and reduces computational requirements.

The terms "viral video" refers to one that becomes popular through the process of Internet sharing, typically through one or more of video sharing websites, social media and email. Heavy.com and Youtube.com are two well-known examples of media sharing websites which contain viral videos.

The terms "video" and "video file" and "digital video media" as used herein" will be afforded a broad and expansive meaning and cover, for example, media in all format(s) which are capable of being electronically conveyed. These include, but are not limited to digital video files, movies, online videos, video games, TV programs and video phone chat and content and the like. It is to be understood that the term video files is to be afforded the broadest possible meaning includes files stored in any form such fixed on computer database and within a cloud computing system, and communicated or conveyed to a viewed or within a network in any manner. Preferably, "digital video file", may also referred to herein as "video file", includes data which can be processed by a computer to produce one or more color pictures or images, motion video, or moving pictures including audio and, in the case of online video, any viewer comment files that are typically transmitted or downloaded with the video file. A digital video file may be copied to a computer before being viewed, or may be viewed as a computer is downloading the digital video file, as in the case of streaming video. Digital "video" file is either online or via streaming media. It is anticipated that there will be huge uptake and usage on YouTube® and the like online videos.

With the scope of the present invention pixel based pattern or feature recognition protocol may be abbreviated to PBPFR.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in a sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g. 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Neither the Title (set forth at the beginning of the first page of the present application) nor the Abstract (set forth at the end of the present application) nor headings is to be taken as limiting in any way as the scope of the disclosed invention(s). An Abstract has been included in this application merely because an Abstract of not more than 150 words is required under 37 C.F.R. section 1.72(b). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The invention can be implemented in numerous ways, including as a process, an apparatus, a system, a computer readable medium such as a computer readable storage medium or a computer network wherein program instructions are sent over optical or communication links. In this specification, these implementations, or any other form that the invention may take, may be referred to as systems or techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

The system and method according to the invention provide a means whereby distinctive images, including but not limited to trade-marks (i.e. brand names and/or logos), computer screens, kitchen appliances, televisions and TV screens, furniture color patterns, auto models, toilet, bathroom and kitchen fixtures, decoration materials and patterns, store signs and fronts, street signs, etc. can be identified and located within a digital video file, to (1) determine the characteristics of the video scene (2) check if the scene comprises any harmful or negative items such a weapons, cigarettes, alcohol or any sexual activity and once the video content and characteristics are established to a pre-defined threshold of probability, place images of products (these would include images of product packages, posters, advertising messages on TV and computer screens, advertisements on billboards, etc.) in the video for the purpose of implicit advertising. A key aspect of the present invention is that such location and identification of an image/object is via one or more pixel-based "pattern" or "feature" recognition protocols.

By way of background, images can be decomposed into constituent objects, which are in turn composed of features.

A feature description of an image reduces the number of dimensions required to describe the image. An image is a two-dimensional (N by N) array of pointwise (or pixel-wise) intensity values. If the number of possible pixel values is p, then the number of possible images is a set ℵ, of size pN2. To distinguish all possible images having N by N pixels, we need a space of N2 dimensions, which is too large in practice to search for a particular image.

The core idea behind feature or pattern analysis is that in real images, objects can be recognized in a space ℜ with a much smaller number of dimensions (a smaller dimensionality) than ℵ. The space ℜ is a feature space and its dimensions are the features. A simple example of a feature space is colour space, where all possible colours can be specified in a 3 dimensional space, with axes L−M, L+M−S and L+M+S, and L, M and S are the photo catches of the long, medium and short wavelength receptors respectively. The reason why a three-dimensional space suffices to distinguish the very much higher dimensional space of surface reflectance spectra is that there is huge redundancy in natural spectra. The reflectance at a given wavelength is highly correlated with reflectance at nearby wavelengths W.

As such, the present invention takes full advantage of a plurality of feature/pattern recognition protocols in identifying an image or object for the purpose of subsequent manipulation.

As used in this document a "distinctive image" means a recognizable image within a video file. Distinctive images include, but are not limited to trade-marks, addresses, and even the entire shapes of certain objects, such as product images, light switches, electrical outlets, road signs, cellular phones, product images, cereal boxes and room design, layout and décor, indoor or outdoor scenes, computer screens, kitchen and other appliances, televisions, furniture, auto models: toilet, bathroom and kitchen fixtures, clothing items, fashion patterns, store signs and store fronts, distinctive buildings, etc. More specifically, a distinctive image includes shapes, edges, corners, features, gradients, contours, shades within a video file. For example, each of beaches, trees, highways, roads, overpasses, bridges will each comprise elements of shapes, edges, corners, features, gradients, contours, shades which distinguish one form another and which provides features which differentiate it from surrounding objects or elements or environment within a given video file.

The process of identification and alteration can be done partially and/or fully (i.e. some steps may be done when editing a video while the remainder may be done at the library website, during transmission to a viewer or at the viewer's device used for viewing such a video) using software during editing of a movie before a video publisher uploads such a video to a central website which has a library of such videos, on a central computer of a website where such a video library resides, during transmission of the video, on a mobile phone, a personal computer, home TV or other such receiving device where a viewer views such a video.

Within the method and system of the present invention, a detailed pixel analysis locates distinctive objects, scenes and/or any other type of images on or in any video, such analysis being implemented with one or more pattern recognition protocols. All feature/pattern recognition protocols are based upon a pixel or pel analysis.

So, the present invention provides a first step of feature or pattern recognition via pel or pixel analysis. While by no means exhaustive, there are various preferred methods to identify distinctive images using PBPFR protocols including:

1. using pixels of one or more specific colors to decipher the color and shape of an image to determine if it is a distinctive image that is being searched (hereinafter referred to as the "Color Method" which is described in more detail below).
2. comparing the cluster of pixels in an image in a digital video frame with pre-established data on concentration of pixels and shape of the cluster for a distinctive image (hereinafter referred to as the "Cluster Method" which is described in more detail below).
3. identifying at least one dominant distinctive feature of reference items, and searching for such feature(s) in a frame-by-frame analysis of the digital video. This method is referred to as "feature matching"
4. placing artificial "glyph" markers or bar codes in videos for post production video analysis and/or editing
5. using a database of an image and computer learning algorithm programs that compare numerous previous like images. These programs analyze a source image and make a statistical inference about the recurring characteristics of the image or object. These recurring consistent characteristics are used to identify similar objects in a frame-by-frame analysis of digital video.

A probability may be established for each method of the likelihood of the existence of the desired distinctive image in the digital video being analyzed followed by a composite probability based on using the methods to determine the likelihood of the existence of the desired distinctive image in a digital video being reviewed. One method may be used alone or one or more methods collectively in order to enhance the overall effectiveness and efficiency of distinctive image identification.

Feature/Pattern Recognition Protocols

All pattern recognition methods start at a level of a single pixel. Since a pixel is one dot or a point in a video frame with a color definition (e.g. a specific shade of red which has a numerical designation), all pattern recognition methods start with a single pixel and analyse from thereon. It should be noted that historical approaches based on pixel level calculations were computationally expensive prior to feature abstractions, but are still widely used (outside the scope of the present invention) to solve certain types of problems. For example, applications where histogram color distribution analysis is needed requires pixel level analysis. However, feature extraction methods that enable computational efficiency are much faster.

Current pattern recognition methods generally employ pixel level filtering, image feature abstraction, object detection, and classification methodologies. Several analytical options are derived from combining one or more algorithms defined in the aforementioned areas.

Filtering is often primarily done to prepare camera or video image data for analytical processes. Accordingly, the image may undergo changes to the coordinate system, pixel noise artifacts, and visual properties (brightness, contrast, and color.) Again, this is done by analyzing small changes in color definition at the pixel level (e.g. if an item that is red is gradually darkening in appearance, then this can be recognized by analyzing the nature of the change in the specific shade of red of that item which may imply that the differing shade of light appearing on that item i.e. one end of the item is in a darker area of the room versus the other end). Notably, feature extraction is highly reliant on image quality, and will often determine the complexity of data abstracted from image pixels. These features are often defined as lines, edges, ridges, or gradients.

Such features are typically detected by analyzing the change or rate of change in pixel definitions within the same or similar color, patterns or formation of the pixels, other patterns that have in prior analysis to show statistical correlation to patterns relating to certain items, features, objects or scenes. There are numerous features or combination of features (like scenes, office desks or kitchen counters since similar type of items occur in such situations and therefore the combination of features is more observable statistically) in digital video where statistical correlation can be observed. Another feature of such pattern recognition methods is to find easily but somewhat distinctive observable features to determine the beginning or end of items like edges and corners since once one discovers a certain type of an edge associated with an item provides a good and a quick starting point for further analysis to determine if the target item exists in the image. For example, abstract lines are often resolved via successive approximation of calculated edge normal vectors formed from detected pixel edges.

Although various forms of edge detection algorithms exist, the Canny image edge filter convolves an image with a Gaussian filter and uses rapid changes in pixel intensity gradients to resolve partial line segments ("A Computational Approach to Edge Detection" IEEE Trans. on Pattern Analysis and Machine Intelligence, 8(6), pp. 679-698, J. Canny, 1986). The edge detection algorithms will usually return a first derivative value for horizontal and vertical directions for the edge gradient boundary. Therefore, it is common to see various algorithms that focus on interpreting discontinuities in image depth, surface orientation, material composition and illumination. Accordingly, these edge lines may be converted into abstract feature contour lines via detection algorithms like Hough transforms[6].

[6] Duda, R. O. and P. E. Hart, "Use of the Hough Transformation to Detect Lines and Curves in Pictures," Comm. ACM, Vol. 15, pp. 11-15 (January, 1972)

Furthermore, these abstractions are often interpreted as various types of relevant features such as corners, blobs, or statistically defined points of interest. Current art has also defined additional complex feature abstractions like image textures, colors, shapes, and motion.

1. The current algorithm implementations strategically select small areas of a larger image to interpret for feature based detection methods like: Scale-invariant feature transform (SIFT, David Lowe, 1999)[7] and in general looks for dominant feature clusters to analyse.

[7] Lowe, David G. (1999). "Object recognition from local scale-invariant features". Proceedings of the International Conference on Computer Vision. 2. pp. 1150-1157. DOI:10.1109/ICCV.1999.790410

2. Speeded Up Robust Feature (SURF, Herbert Bay, 2006)[8], in general, similar to SIFT, looks for much more dominant feature clusters but is computationally faster, and

[8] US 2009238460, Ryuji Funayama, Hiromichi Yanagihara, Luc Van Gool, Tinne Tuytelaars, Herbert Bay, "ROBUST INTEREST POINT DETECTOR AND DESCRIPTOR", published 2009 Sep. 24

3. Haar wavelets ("Computer Vision and Pattern Recognition", Viola and Jones, 2001)[9] generally looks for clusters of gradients to analyse.

[9] Viola, Jones: Robust Real-time Object Detection, IJCV 2001

Although it is still common to find traditional methods based on Hough transform which can find imperfect occurrences of some types of objects (such as lines, circles, or ellipses) via a robust voting method ("generalized Hough transform", Richard Duda and Peter Hart, 1972)[10] Generally, this algorithm translates image data from a Cartesian coordinate system into a Polar coordinate system, and interprets the sinusoidal forms of the image data using common signal analysis techniques. This abstract data often becomes the input for other analytical algorithms.

[10] Duda, R. O. and P. E. Hart, "Use of the Hough Transformation to Detect Lines and Curves in Pictures," Comm. ACM, Vol. 15, pp. 11-15 (January, 1972)

Additional image points or regions may undergo further analysis to determine associated segments of relevant content. For example, multiple image regions would be associated with a known object of interest that is partially occluded. Object detection is often implemented to interpret abstract features to form an inference of object pose and scale. Accordingly, image registration algorithms will compare abstract models against known features extrapolated from image pixels, and image recognition algorithms may classify a detected object into different categories.

Classification of objects does not necessitate a model based approach, and is commonly done via a Support Vector Machine based algorithm (SVM, Vladimir N. Vapnik, 1995)[11]. This approach is commonly referred to as "learning algorithms". Under this method, numerous images of a particular item or groups of items are analysed to determine statistically common features and these results are then used to analyse images to determine the probabilistic estimate if a particular item is present in the image being analysed. Such statistical feature analysis based algorithms are still prolific as they are known to be more robust with noisy pixel data, and do not require a fully intact image to successfully identify an objects presence.

[11] Cortes, Corinna; and Vapnik, Vladimir N.; "Support-Vector Networks", Machine Learning, 20, 1995.

Preferably, feature or pattern based recognition protocols are based on:

- Identifying at least one dominant distinctive feature of reference items, and searching for such feature(s) in a frame-by-frame analysis of the digital video. This method is referred to as "feature matching"
- Placing artificial "glyph" markers or bar codes in videos for post production video analysis and/or editing
- Using a database of an image and computer learning algorithm programs that compare numerous previous like images. These programs analyze a source image and make a statistical inference about the recurring characteristics of the image or object. These recurring consistent characteristics are used to identify similar objects in a frame-by-frame analysis of digital video.

In one aspect, there is provided herein a method of identifying a distinctive image within a digital video file comprises a) identifying a first pixel of a selected color relating to the distinctive image; b) scanning the adjacent pixels to determine the shape of the image, said scanning including any number of directions up to and including a 360° scan to determine at least two outermost endpoints of the color, relative to the first pixel; c) determining a distance between the first pixel and the outermost end point in each direction scanned; d) determining the ratio of the distance between the outermost end points; and e) comparing this ratio to predetermined known data for the distinctive image and data from the audio file and viewer comments relating to this digital video, to determine the location of the distinctive image in the video file.

The present invention further provides a method of identifying a distinctive image within a digital video file which comprises: a) selecting data representing a set of images within the digital video file; b) scanning the data for an indication of a color associated with the distinctive image, said first indication of color being "point one"; c) searching from point one for the farthest reach of that color before the color changes, said searching including any number of directions up to and including a 360° scan; d) determining a distance between the point one and each outermost end points in each direction scanned; e) determining the ratio of the distance between the outermost end points; f) comparing this ratio to predetermined known data for the distinctive image to determine the location of the distinctive image in the video file; g) based on these ratio and the comparison, and data from the audio file and viewer comments relating to this digital video, calculating a probability (X) that the image is present in the selected data; h) selecting another set of data representing this set of images within the digital video file; i) comparing the concentration of similar pixels and the shape of this cluster of concentration of pixels to predetermined known data for the distinctive image; j) based on these concentration, shape and the comparison, and data from the audio file and viewer comments relating to this digital video, calculating a probability (XX) that the image is present in the selected data; k) if either of the probability numbers (X or XX) exceeds a confidence level, locating the distinctive image in the digital video file; and l) repeating steps a) through k) on following data representing more than one distinctive image in a frame and for same or other distinctive images in subsequent frames until the calculated probability does not exceed the confidence level. m) If either or both probabilities (X or XX) do not exceed a confidence level, determine the composite probability (XXX); n) if the composite probability (XXX) exceeds the confidence level, locating the distinctive image in the digital video file.

The present invention provides a method of identifying a distinctive image within a digital video file which comprises: a) selecting data representing a set of images within the digital video file; b) scanning the data for an indication of a first color associated with the distinctive image, said first indication of said first color being "colour one/point one"; c) searching from colour one/point one for the farthest reach of that first color before the color changes, said searching including any number of directions up to and including a 360° scan; d) determining a distance between the point one and each outermost end points of said first colour in each direction scanned; e) determining the ratio of the distance between the outermost end points; f) comparing this ratio to predetermined known data for the distinctive image to determine the location of the distinctive image in the video file; g) based on these ratios and the comparison, and data from the audio file and viewer comments relating to this digital video calculating a probability that the image is present in the selected data; h) if the probability does not exceed a confidence level, repeating steps a) through g) on a second colour; i) if the probability does not exceed a confidence level, repeating steps a) through g) on at least third colour; j) once a probability does exceeds a confidence level identifying this probability (Y) for that distinctive image k); repeating steps a) through j) on data representing more than one distinctive image in a frame and for same or other distinctive images in subsequent frames until the calculated probability does not exceed the confidence level l) selecting data representing this set of images within the digital video file; m) comparing the concentration of similar pixels and the shape of this cluster of such concentration of pixels to predetermined known data for the distinctive image; m) based on this concentration, shape and the comparison, and data from the audio file and viewer comments relating to this digital video, calculating a probability (YY) that the image is present in the selected data; n) determine the combined probability of XX and YY that the image is present in the selected data; o) if the combined probability (XXX) exceeds the confidence level, locating the distinctive image in the digital video file and p) repeating steps a) through p) on following data representing more than one distinctive image in a frame and for same or other distinctive images in subsequent frames until the calculated probability does not exceed the confidence level.

The present invention provides a method of identifying a distinctive image within a digital video file which comprises: a) selecting data representing a set of images within the digital video file; b) scanning the data for an indication of a first color associated with the distinctive image, said first indication of said first color being "colour one/point one"; c) searching from colour one/point one for the farthest reach of that first color before the color changes, said searching including any number of directions up to and including a 360° scan; d) determining a distance between the point one and each outermost end points of said first colour in each direction scanned; e) determining the ratio of the distance between the outermost end points; f) comparing this ratio to predetermined known data for the distinctive image to determine the location of the distinctive image in the video file; g) based on these ratios and the comparison, and data from the audio file and viewer comments relating to this digital video calculating a probability that the image is present in the selected data; h) if the probability does not exceed a confidence level, repeating steps a) through g) on a second colour; i) if the probability does not exceed a confidence level, repeating steps a) through g) on at least third colour; j) once a probability does exceeds a confidence level identifying this probability (Y) for that distinctive image k); repeating steps a) through j) on data representing more than one distinctive image in a frame and for same or other distinctive images in subsequent frames until the calculated probability does not exceed the confidence level l) selecting data representing this set of images within the digital video file; m) comparing the concentration of similar pixels and the shape of this cluster of such concentration of pixels to predetermined known data for the distinctive image; m) based on this concentration, shape and the comparison, and data from the audio file and viewer comments relating to this digital video, calculating a probability (YY) that the image is present in the selected data; n) determine the combined probability of XX and YY that the image is present in the selected data; o) if the combined probability (XXX) exceeds the confidence level, locating the distinctive image in the digital video file and p) repeating steps a) through p) on following data representing more than one distinctive image in a frame and for same or other distinctive images in subsequent frames until the calculated probability does not exceed the confidence level.

A system for identifying and/or altering an image of a product within a digital video file is provided, including: a) a first computer requesting the digital video file from a second computer over a network; b) at least one of the first or second computers configured to: a) select data representing a set of images within the digital video file; b) scan the data for an indication of a color associated with the distinctive image, said first indication of color being "point one"; c) search from point one for the farthest reach of that color before the color changes, said search including any number of directions up to and including a 360° scan; d) determine a distance between the point one and each outermost end points in each direction scanned; e) determine the ratio of the distance between the outermost end points; f) compare this ratio to predetermined known data for the distinctive image to determine the location of the distinctive image in the video file; g) based on these ratio and the comparison, and data from the audio file and viewer comments relating to this digital video, calculate a probability that the image is present in the selected data; h) if the probability exceeds a confidence level, alter, add and/or delete the distinctive image; and i) repeat steps a) through h) on following data representing more than one distinctive image in a frame and for same or other distinctive images in subsequent frames until the calculated probability does not exceed the confidence level.

In one aspect, there is provided a method of identifying a distinctive image within a digital video file which comprises a) identifying a first pixel of a selected color relating to the distinctive image; b) scanning the adjacent pixels to determine the shape of the image, said scanning including any number of directions up to and including a 360° scan to determine at least two outermost endpoints of the color, relative to the first pixel; c) determining a distance between the first pixel and the outermost end point in each direction scanned; d) determining the ratio of the distance between the outermost end points; and e) comparing this ratio to predetermined known data for the distinctive image and data from the audio file and viewer comments relating to this digital video, to determine the location of the distinctive image in the video file (the "Color Method").

Since distinctive images have relatively unique combination of shapes and colors, this invention enables much quicker identification by determining the ratio of the distance between the outermost points around the "perimeter" and/or, with certain distinctive images, one or more inner part of the image. Since the size of distinctive images (e.g. number of pixels) may vary depending on how much of the video frame is occupied by one such image, use of ratios of distances enables identification of distinctive images since the ratios (like between length and width) would stay constant irrespective of image size. The predetermined ratio data for each distinctive image would account for images being slanted or shown sideways by using the ratios which stay constant even if the image is placed differently or with data that factors in angles of view in the ratios.

In another aspect, there is provided a further method of identifying a distinctive image within a digital video file which comprises: a) selecting data representing a set of images within the digital video file; b) scanning the data for an indication of a color associated with the distinctive image, said first indication of color being "point one; c) comparing the concentration of similar pixels (to point one) and the shape of this cluster of concentration of pixels to predetermined known data for the distinctive image; d) based on these concentrations, shapes and the comparisons, calculating a probability (XX) that the image is present in the selected data (the "Cluster Method").

The present invention further provides a method of identifying a distinctive image within a digital video file which comprises: a) selecting data representing a set of images within the digital video file; b) scanning the data for an indication of a color associated with the distinctive image, said first indication of color being "point one"; c) searching from point one for the farthest reach of that color before the color changes, said searching including any number of directions up to and including a 360° scan; d) determining a distance between the point one and each outermost end points in each direction scanned; e) determining the ratio of the distance between the outermost end points; f) comparing this ratio to predetermined known data for the distinctive image to determine the location of the distinctive image in the video file; g) based on these ratio and the comparison, calculating a probability (X) that the image is present in the selected data; h) selecting another set of data representing this set of images within the digital video file; i) comparing the concentration of similar pixels and the shape of this cluster of concentration of pixels to predetermined known data for the distinctive image; j) based on these concentration, shape and the comparison, calculating a probability (XX) that the image is present in the selected data; k) if either of the probability numbers (X or XX) exceeds a confidence level, locating the distinctive image in the digital video file; and l) repeating steps a) through k) on following data representing more than one distinctive image in a frame and for same or other distinctive images in subsequent frames until the calculated probability does not exceed the confidence level. m) If either or both probabilities (X or XX) do not exceed a confidence level, determine the composite probability (XXX); n) if the composite probability (XXX) exceeds the confidence level, locating the distinctive image in the digital video file.

The present invention provides a method of identifying a distinctive image within a digital video file which comprises: a) selecting data representing a set of images within the digital video file; b) scanning the data for an indication of a first color associated with the distinctive image, said first indication of said first color being "colour one/point one"; c) searching from colour one/point one for the farthest reach of that first color before the color changes, said searching including any number of directions up to and including a 360° scan; d) determining a distance between the point one and each outermost end points of said first colour in each direction scanned; e) determining the ratio of the distance between the outermost end points; f) comparing this ratio to predetermined known data for the distinctive image to determine the location of the distinctive image in the video file; g) based on these ratios and the comparison, calculating a probability that the image is present in the selected data; h) if the probability does not exceed a confidence level, repeating steps a) through g) on a second colour; i) if the probability does not exceed a confidence level, repeating steps a) through g) on at least third colour; j) once a probability does exceeds a confidence level identifying this probability (Y) for that distinctive image k); repeating steps a) through j) on data representing more than one distinctive image in a frame and for same or other distinctive images in subsequent frames until the calculated probability does not exceed the confidence level l) selecting data representing this set of images within the digital video file; m) comparing the concentration of similar pixels and the shape of this cluster of such concentration of pixels to predetermined known data for the distinctive image; m) based on this concentration, shape and the comparison calculating a probability (YY) that the image is present in the selected data; n) determine the combined probability of XX and YY that the image is present in the selected data; o) if the combined probability (XXX) exceeds the confidence level, locating the distinctive image in the digital video file and p) repeating steps a) through p) on following data representing more than one distinctive image in a frame and for same or other distinctive images in subsequent frames until the calculated probability does not exceed the confidence level.

A system for identifying and/or altering an image of a product within a digital video file is provided, including: a) a first computer requesting the digital video file from a second computer over a network; b) at least one of the first or second computers configured to: a) select data representing a set of images within the digital video file; b) scan the data for an indication of a color associated with the distinctive image, said first indication of color being "point one"; c) search from point one for the farthest reach of that color before the color changes, said search including any number of directions up to and including a 360° scan; d) determine a distance between the point one and each outermost end points in each direction scanned; e) determine the ratio of the distance between the outermost end points; f) compare this ratio to predetermined known data for the distinctive image to determine the location of the distinctive image in the video file; g) based on these ratio and the comparison, calculate a probability that the image is present in the selected data; h) if the probability exceeds a confidence level, alter, add and/or delete the distinctive image; and i) repeat steps a) through h) on following data representing more than one distinctive image in a frame and for same or other distinctive images in subsequent frames until the calculated probability does not exceed the confidence level.

A method of altering a distinctive image is provided, including: a) receiving a digital video file playable at a computer; b) locating a distinctive image within the digital video file; c) altering said distinctive image to a desired, updated image. Without limiting the generality of the foregoing, there are a variety of motivations to alter an image, many of which are described further herein. For example, this altered, updated image may have a greater commercial value or appeal, or it may be more target market specific.

The present invention further provides a method of identifying a distinctive image within a digital video file which comprises: a) selecting data representing a set of images within the digital video file; b) comparing the concentration of similar pixels and the shape of this cluster of concentration of pixels to predetermined known data for the distinctive image to determine the location of the distinctive image in the video file; g) based on a comparison of this concentration and shape in the digital video file and data from the audio file and viewer comments relating to this digital video, determining the location of the distinctive image in the digital video file.

A method of determining a context of a distinctive image within data of a digital video file is provided, including: a) locating the first distinctive image within the digital video file using the Colour Method and/or the Cluster Method; b) locating a second distinctive image within the digital video file using the Colour Method and/or the Cluster Method; c) locating a third and more distinctive images using the Colour Method and/or the Cluster Method; d) using said distinctive images to determine a context of the frame.

It is to be understood that, depending on the image to be identified, more than one colour can be "processed" in accordance with the foregoing steps, and each colour can be scanned in any number of selected directions. Whether a second, third, fourth or further colours, or the Cluster Method are processed depends on confidence level achieved by the prior processing step, after ratio calculation and comparison.

The methods and systems of the present invention are not based primarily on distances (for example first colour pixel to outermost end point) but rather it are based upon the calculation of ratios between two or more outermost end points and the use of these ratios to define probabilities that the correct image has been identified. As such, for example, if a logo appears as a different size in different frames (close up vs. distance shot), it will still be readily identifiable based on the ratios as provided herein.

Since all methods for detailed computerized analysis of digital video start at the pixel level, the Color and \Cluster methods described above of analyzing a digital video file to identify or locate a distinctive image, any object or item, or to determine the characteristics of a particular scene in a video apply pattern recognition algorithms and protocols.

It is to be understood that determining the probability of a distinctive image being located a video file may be done at several levels and combining two or more of feature/pattern recognition protocols as described herein. Firstly, for example, this may be done when analyzing for the first color and each further color using the color method and similarly for the Cluster method if this is used first. Secondly, this probability is determined when the second method (i.e. Color or Cluster method) is used. Thirdly, a composite probability is calculated using results from the two or more methods. Fourthly, in evaluating location of second and further distinctive images, the probability of the location of other distinctive images is factored into to determine the probability of the next distinctive image. Lastly, the locations of all the distinctive images that are considered to be located in a digital video file are used to determine the probabilistic definition of the video scene and context.

An alternative within the scope of the present invention is the use of learning algorithms (one type of a pattern recognition software) to determine if a scene exists in a video. This is done by a method comprising taking numerous (the number may be in thousands and is determined by the statistical validity required for this analysis) videos of a particular scene type (e.g. indoors or outdoors, kitchens, basements, offices, living rooms, highways, main shopping streets, side residential streets, ski slopes, shopping malls, etc.). and then statistically determining the recurring characteristics s of a particular type of a scene (this may be accomplished via use of a learning algorithm). Once this is done, then a video is analyzed to determine where scene content is not known and a probability is calculated of the presence of a particular scene. Subsequently an image is manipulated in accordance with the present invention. By this method, both positive and negative identification of an object is achieved within scenes. For example, if you can eliminate ex red cars, it is easier to find white cars. This is hereinafter referred to a "scene classification and analysis".

Once a scene is reviewed for existence of several distinctive images, then the location characteristics (relative distance between the images, height and depth of location of each image in relation to other images, effect of lighting or shading, etc.) of all the distinctive images identified is compared to predetermined data to establish the probability of the existence of a specific scene in the digital video. Besides analyzing the digital video frame by frame as stated above, this analysis would also use all the data on viewer comments that typically accompany online video and the audio file relating to this video to determine the location/existence of distinctive images and the nature of the video scene.

For example a refrigerator, a stove, a microwave, a toaster, and a kitchen sink have been identified using the methods of the present invention. All the appliance are GE white models as determined from either the GE logo being visible on the appliances (identified as a distinctive image) and/or from the distinct shape and color of the appliances. All this data (i.e. analysis of the video image plus optionally the audio file and the viewer comments) regarding the several appliances determined to be in the video, will be compared to pre-established data available on typical kitchen layouts to establish the probability of the scene being a kitchen in an apartment or a typical single family home.

The use of audio data and viewer comments are optional tools for use in accordance with the methods of the present invention. The use is illustrated as follows, by way of example: there is a popular short, YouTube®, online comedy video of an infant (sitting on a high chair) having a discussion with his mother that he only likes her when she gives him cookies (referred to herein as the Cookie Kid video). This would be an ideal place for a cookie manufacturer to place a box of its brand of cookies in the video but this can only be done if one can determine the background of the scene and confirm its appropriateness for placement of a popular brand. This video is based in a kitchen with the infant's high chair being in front of the kitchen counter. In this scene there is a refrigerator door, a microwave oven and various power outlets that are clearly visible. Since each of these three items have a distinctive combination of shapes and colors, one can identify these images using the method(s) of the present invention and infer with a reasonably high probability that this video is based in a kitchen and that a kitchen counter is visible just behind the high chair that the infant is sitting on.

The audio file of this video and past online viewer comments (generally available as part of the data file associated with the video) may, typically, provide further confirmation that this scene is in a typical kitchen and that the discussion is based on the infant's desire for cookies and therefore, one could place a box of cookies on the counter behind the infant. In this same example, if there is another brand of a food or a beverage package originally placed on the counter in the original video (for example a Tropicana® orange juice carton), then this product may be identified as a distinctive image using the method(s) of the present invention and either replaced with a cookie box and/or a cookie box can be placed adjacent to or near it (the environs). Additionally, if the purchase or internet data on the digital file viewer indicates that the viewer does not like or does not regularly purchase orange juice but is a regular buyer of Mott's® apple juice and of Oreo® cookies, then, a competitive brand like Treetop® apple juice may like to advertise to Motts users, requiring the Tropicana carton be replaced with a Treetop apple juice carton. Similarly, Oreo may have a different advertising objective of emphasizing its brand to its own users and, therefore, would like the image of a box of Oreo cookies to be placed adjacent to the image of a Treetop carton.

As such, in a further aspect of the present invention, there is provided a method to substitute images in a digital video file, based on audio data which accompanies the video file which comprises: a) analyzing audio content for cues in relation to a desired image; b) searching the video for the desired image, said searching for the image being based upon at least one type pixel-based "pattern" or "feature" recognition protocols and identifying a proposed image match to the desired image; (c) statistically verifying that the proposed image is the desired image; and (d) manipulating the desired image by way of an action selected from the group consisting of: deleting the desired image, replacing all of the desired image with an alternative image, replacing a part of the desired image with an alternative image, adding at least one feature to the desired image, and altering an environment surrounding the desired image.

In a further aspect of the present invention, there is provided a method to identify and substitute images in a digital video file, based at least in part on purchasing preferences of a viewer of said video file which comprises: a) acquiring information regarding the viewer's past product purchases to determine the viewer's purchase behavior in regards to a product or service, thereby to identify a "preferred brand"; b) identifying within the video file a like product or service; c) determining if the like product or service is the preferred brand; d) if it is not, substituting the like product or service in the video file with the preferred brand; and wherein searching the video for an image relating to the like product or service is based upon at least one type pixel-based "pattern" or "feature" recognition protocol Similarly, if the viewer is watching this video in a different language (e.g. Mandarin), then the advertiser may require that all product packages that are newly placed be packages of the brand in Mandarin and any packages that were in the original video are substituted with Mandarin packages.

As such, in a further aspect of the present invention, there is provided a method to identify and substitute images in a digital video file, based at least in part on based on a language preference of a viewer of said file which comprises: a) acquiring information regarding the viewer's language, thereby to identify a "preferred text language"; b) identifying within the video file an original text language; c) determining if the preferred text language is the preferred text language; d) if it is not, substituting the original text language in the video file with the preferred text language; and wherein searching the video for an image relating to original text language is based upon at least one type pixel-based "pattern" or "feature" recognition protocol.

A further illustration of the application of the identification and image manipulation system and method of the present invention is as follows: within a video file a young lady is explaining, in a comical way, how people use computers. She is sitting in front of a table which has a computer screen and a key board. A computer screen and key board are relatively distinctive images and could be identified using the methodology outlined herein. Once these are identified, one could use the light shades and angles in the video to determine the horizontal surface of the table on which the computer is resting and also that a large part of the table surface is empty. This would enable placement of a partially open box of Pizza Hut® and a can of Coke (indicating that the actor is consuming this product). Additionally, when the computer screen is off (which can be identified using the above method of identifying a distinctive image) a screen saver with an advertising message (maybe about Coke) could be placed on the computer screen.

The following discussion provides a brief and general description of a suitable computing environment in which various embodiments of the system may be implemented. Although not required, embodiments will be described in the general context of computer-executable instructions, such as program applications, modules, objects or macros being executed by a computer. Those skilled in the relevant art will appreciate that the invention can be practiced with other computing system configurations, including hand-held devices, multiprocessor systems, microprocessor-based or programmable consumer electronics, personal computers ("PCs"), network PCs, mini-computers, mainframe computers, mobile phones, personal digital assistants, smart phones, personal music players (like iPod) and the like. The embodiments can be practiced in distributed computing environments where tasks or modules are performed by remote processing devices, which are linked through a communications network. In a distributed computing environment, program modules may be located in both local and remote memory storage devices.

As used herein, the terms "computer" and "server" are both computing systems as described in the following. A computing system may be used as a server including one or more processing units, system memories, and system buses that couple various system components including system memory to a processing unit. Computing system will at times be referred to in the singular herein, but this is not intended to limit the application to a single computing system since in typical embodiments, there will be more than one computing system or other device involved. Other computing systems may be employed, such as conventional and personal computers, where the size or scale of the system allows. The processing unit may be any logic processing unit, such as one or more central processing units ("CPUs"), digital signal processors ("DSPs"), application-specific integrated circuits ("ASICs"), etc. Unless described otherwise, the construction and operation of the various components are of conventional design. As a result, such components need not be described in further detail herein, as they will be understood by those skilled in the relevant art.

The computing system includes a system bus that can employ any known bus structures or architectures, including a memory bus with memory controller, a peripheral bus, and a local bus. The system also will have a memory which may include read-only memory ("ROM") and random access memory ("RAM"). A basic input/output system ("BIOS"), which can form part of the ROM, contains basic routines that help transfer information between elements within the computing system, such as during startup.

The computing system also includes non-volatile memory. The non-volatile memory may take a variety of forms, for example a hard disk drive for reading from and writing to a hard disk, and an optical disk drive and a magnetic disk drive for reading from and writing to removable optical disks and magnetic disks, respectively. The optical disk can be a CD-ROM, while the magnetic disk can be a magnetic floppy disk or diskette. The hard disk drive, optical disk drive and magnetic disk drive communicate with the processing unit via the system bus. The hard disk drive, optical disk drive and magnetic disk drive may include appropriate interfaces or controllers coupled between such drives and the system bus, as is known by those skilled in the relevant art. The drives, and their associated computer-readable media, provide non-volatile storage of computer readable instructions, data structures, program modules and other data for the computing system. Although computing systems may employ hard disks, optical disks and/or magnetic disks, those skilled in the relevant art will appreciate that other types of non-volatile computer-readable media that can store data accessible by a computer may be employed, such a magnetic cassettes, flash memory cards, digital video disks ("DVD"), Bernoulli cartridges, RAMs, ROMs, smart cards, etc.

Various program modules or application programs and/or data can be stored in the system memory. For example, the system memory may store an operating system, end user application interfaces, server applications, and one or more application program interfaces ("APIs").

The system memory also includes one or more networking applications, for example a Web server application and/or Web client or browser application for permitting the computing system to exchange data with sources, such as clients operated by users and members via the Internet, corporate Intranets, or other networks as described below, as well as with other server applications on servers such as those further discussed below. The networking application in the preferred embodiment is markup language based, such as hypertext markup language ("HTML"), extensible markup language ("XML") or wireless markup language ("WML"), and operates with markup languages that use syntactically delimited characters added to the data of a document to represent the structure of the document. A number of Web server applications and Web client or browser applications are commercially available, such as those available from Mozilla and Microsoft.

The operating system and various applications/modules and/or data can be stored on the hard disk of the hard disk drive, the optical disk of the optical disk drive and/or the magnetic disk of the magnetic disk drive.

A computing system can operate in a networked environment using logical connections to one or more client computing systems and/or one or more database systems, such as one or more remote computers or networks. The computing system may be logically connected to one or more client computing systems and/or database systems under any known method of permitting computers to communicate, for example through a network such as a local area network ("LAN") and/or a wide area network ("WAN") including, for example, the Internet. Such networking environments are well known including wired and wireless enterprise-wide computer networks, intranets, extranets, and the Internet. Other embodiments include other types of communication networks such as telecommunications networks, cellular networks, paging networks, and other mobile networks. The information sent or received via the communications channel may, or may not be encrypted. When used in a LAN networking environment, the computing system is connected to the LAN through an adapter or network interface card (communicatively linked to the system bus). When used in a WAN networking environment, the computing system may include an interface and modem (not shown) or other device, such as a network interface card, for establishing communications over the WAN/Internet.

In a networked environment, program modules, application programs, or data, or portions thereof, can be stored in the computing system for provision to the networked computers. In one embodiment, the computing system is communicatively linked through a network with TCP/IP middle layer network protocols; however, other similar network protocol layers are used in other embodiments, such as user datagram protocol ("UDP"). Those skilled in the relevant art will readily recognize that these network connections are only some examples of establishing communications links between computers, and other links may be used, including wireless links.

While in most instances the computing system will operate automatically, where an end user application interface is provided, an operator can enter commands and information into the computing system through an end user application interface including input devices, such as a keyboard, and a pointing device, such as a mouse. Other input devices can include a microphone, joystick, scanner, etc. These and other input devices are connected to the processing unit through the end user application interface, such as a serial port interface that couples to the system bus, although other interfaces, such as a parallel port, a game port, or a wireless interface, or a universal serial bus ("USB") can be used. A monitor or other display device is coupled to the bus via a video interface, such as a video adapter (not shown). The computing system can include other output devices, such as speakers, printers, etc.

Figure 1A:
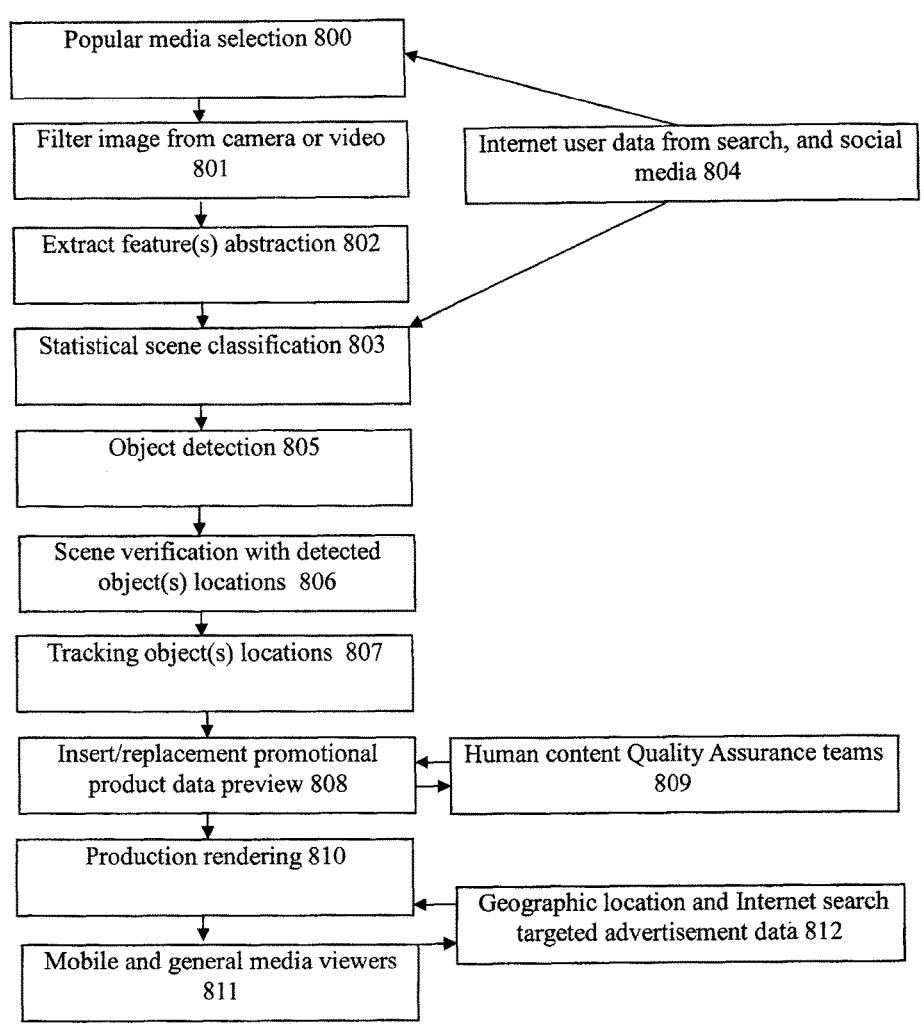
FIG. 1a a flow chart showing the method by which distinctive images are identified according to the invention.

As seen in FIG. 1a, a a typical embodiment of a system according to the invention is shown.

As seen in FIG. 1, a typical embodiment of a system according to the invention is shown. A user operates a computer 100 capable of playing digital video, such as streaming video. Computer 100 is a computing system as described above, and has a network link and software and/or hardware to play and display videos from one or more servers 400 accessible via network 300. Computer 100 is typically connected to network via server 200. Server 200 may be operated by an Internet Service Provider (ISP) or a telephone company exchange which handles the traffic from mobile and smart phones. Server 200 communicates and exchanges files with other servers 400 in communication with network 300. Network 300 may be the Internet, but may also be a LAN, or WAN.

When a digital video file 500, which may be streaming video, is requested by computer 100, server 200 requests the file 500 from server 400, and server 400 responds by providing file 500 to server 200, and thereby to computer 100. File 500 thus passes through several computers or servers, including several that may be in network 300, each of which has the opportunity to identify distinctive images in video file 500 according to its instructions. For example, computer 100 may identify some distinctive images on video file 500 and then alter, delete, or add some images on video file 500. This may include placement of branded products in the appropriate scenes after identifying several distinctive images on video file 500 which determined the video scene being appropriate for such placement which may be at the request of the owner of such trade-mark.

Video file 500 is typically in server 400's memory as part of record 600 within a database. Record 600 may contain a variety of data about video file 500, and may also contain information about users as described below.

There are several other locations where video file may be analyzed for identification of distinctive images and some images may be altered, deleted or added. For example, a trunk line along which the files are transmitted; or on server 400, for example if server 400 hosts a website displaying videos, such as YouTube, whereat the public can post and view videos. The method allows providers of such websites to digitally and electronically insert product or brand images, insert poster(s) that advertises any product or service on wall-space, insert screen savers or run advertising clips on computer and TV screens that are originally in the video file or inserted for this purpose, into videos before these are viewed by the public and to sell this service as product and image placement or other type of advertising. The substitution could also be conducted on a server 400 of a search engine, such as GOOGLE®, where the method could be used to identify a product placement opportunity (as described in the previous paragraph) on any electronic picture or video communication and change video images as required. Alternatively ISP server 200 could alter video file 500, for example based on the geographic location of computer 100.

Image Selection and Identification

The present invention provides a method for a user to interactively manipulate online digtial video file content, comprising the steps of:
  (a) providing said user with an interface, said interface providing a plurality of questions answerable by said user, said questions including those relating to one or more characteristics of an image desired to be manipulated (the "desired image");
  (b) searching at least one video for the desired image, said searching for the image being based upon at least one type pixel-based pattern/feature recognition protocol and identifying a proposed image match to the desired image;
  (c) statistically verifying that the proposed image is the desired image; and
  (d) manipulating the desired image by way of an action selected from the group consisting of: deleting the desired image, replacing all of the desired image with an alternative image, replacing a part of the desired image with an alternative image, adding at least one feature to the desired image, and altering an environment surrounding the desired image.

The present invention further provides, in another aspect, a system to manipulate online digital video file content with respect to an image desired to be manipulated (the "desired image") comprising
a) a first computer requesting the digital video file from a second computer over a network; and
b) at least one of the first or second computers configured to:
i) select data representing a set of images within the digital video file; and ii) scan the data for pixel characteristics based upon at least one type pixel-based pattern/feature recognition protocol and thereafter identifying a proposed image match to the desired image; iii) statistically verify that the proposed image is the desired image; and iv) manipulating the desired image by way of an action selected from the group consisting of: deleting the desired image, replacing all of the desired image with an alternative image, replacing a part of the desired image with an alternative image, adding at least one feature to the desired image, and altering an environment surrounding the desired image.

In one preferred form, the method, as seen in FIG. 1a begins with selection of a popular media 800 from which an image is filtered from a camera or video at step 801. Features are abstracted at 802 and a statistical scene analysis is conducted at 803. Feeder sources to 800 and 803 are shown as internet user data from searches and social media at 804. At step 805 and using at least one type pixel-based pattern/feature recognition protocol, an object is detected. Further, using these same protocols, a scene within which object is detected is verified at 806. At 807, the object is tracked within the video file and at 808, a manipulation of the image is made. This manipulation need not be a substitution but may be an insertion of an image (wherein no equivalent image was present in the original video). Human QC is applied (in a two way feedback loop) at 809 and production is rendered at 810. Mobile and general media viewers view the images at 811 and at 812, internet search targeted advertisement data may be applied to 810 (production) as location as geographic specificity targeting.

Figure 2:
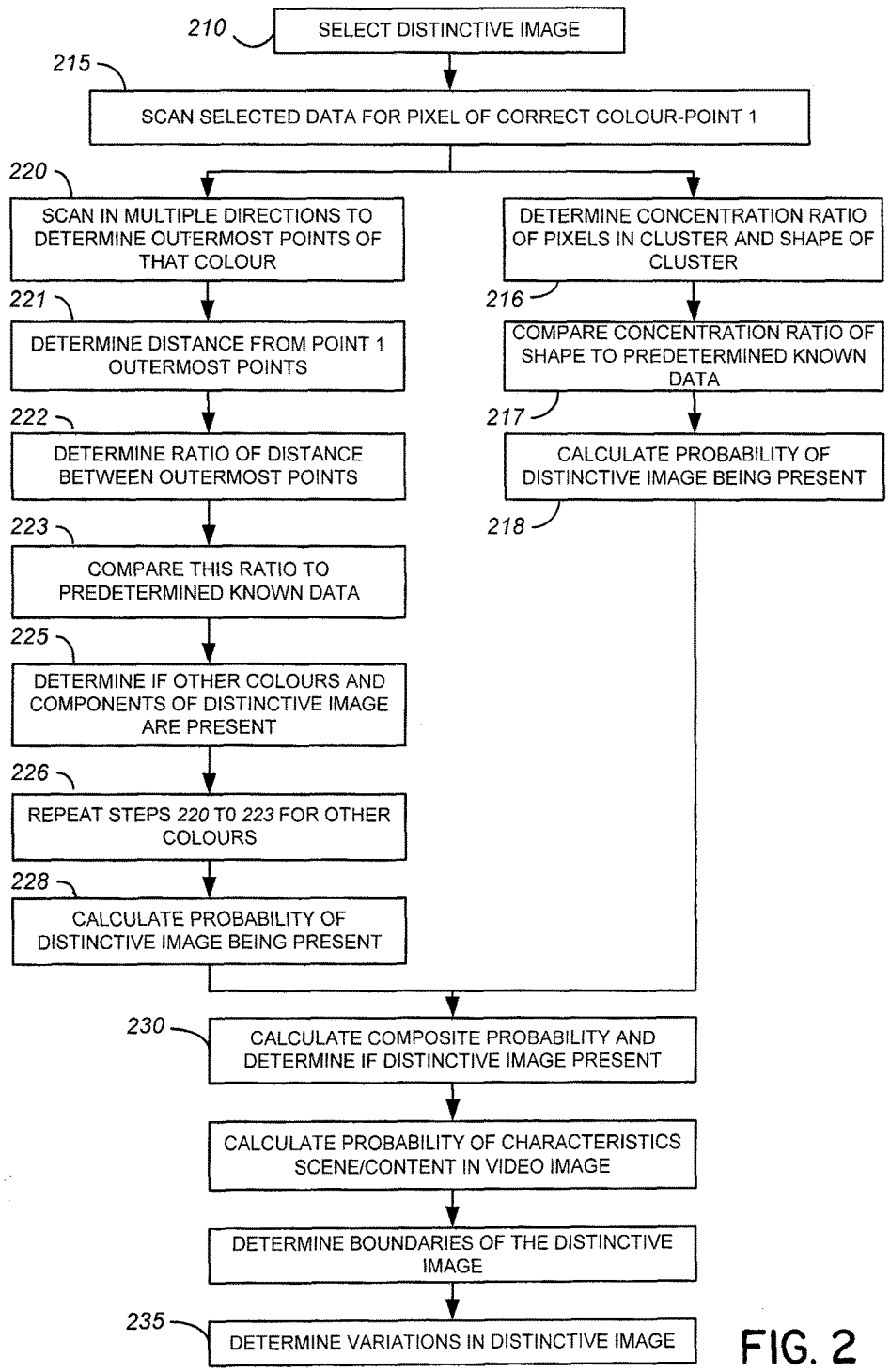
FIG. 2 is a flow chart showing a more specific method by which distinctive images are identified according to the invention.
Figure 3A:
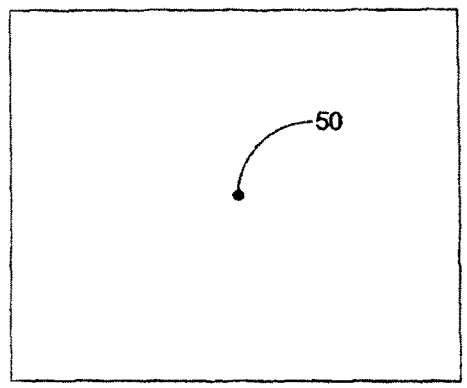
FIGS. 3A through 3D are views of data representing a frame in which a distinctive image is being searched for according to the invention.
Figure 3B:
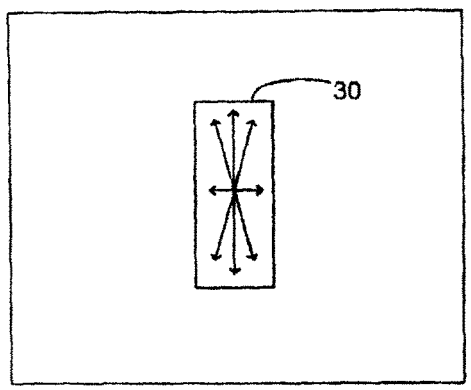
Figure 3C:
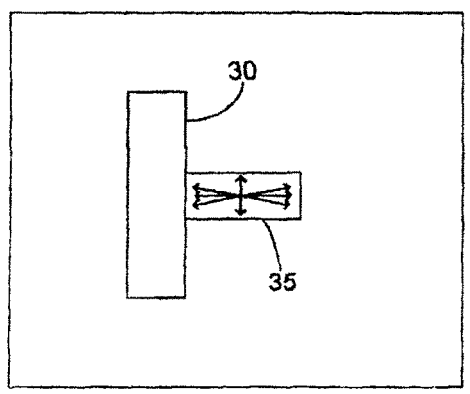
Figure 3D:
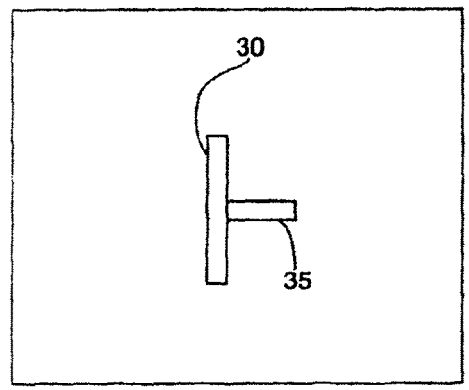

In one preferred form, the method, as seen in FIG. 2, begins with selection of a distinctive image, such as a product with a trade-mark (step 210). Distinctive images typically have a unique color and shape. For example many distinctive images have a particular combination of shapes and colors, as well as characters, such as text, numbers or symbols, on such images. As an example, a CREST® logo appears with a particular combination of colors and shapes on a box of toothpaste. Similarly, other types of distinctive images have a relatively unique combination of shapes and colors to enable identification. The method according to the invention uses these unique patterns to identify distinctive images to decipher the characteristics of a video scene to determine if such a scene is appropriate for placement of a product image. A distinctive image may also be identified for the image itself to be changed or as a location identifier to alter the space in the video image surrounding or adjacent to the said distinctive image. Note in some cases, video file 500 may be flagged as containing a particular trade-mark or product, in which case the system need only locate the trade-mark in the video frames, rather than determine if such a trade-mark is present. Such flagging could provide either detailed information about distinctive images within a video file, such as that a certain trade-mark appears between certain times, and the position or size of the image, or provide other information, such that the video is set in a certain location, such as a kitchen or bathroom, or a certain geographical location, such as a particular city.

The distinctive images appear as images within data that is part of the digital video file. This data provides information about a plurality of pixels within the digital video, each pixel having certain characteristics such as a location within an image, color, brightness, etc.

Prior to attempting to recognize digital video data of a streaming video that include such a distinctive image, it is important that the unique combinations of these colors and shapes be known to a required degree. For example, the relationship of the colors as portrayed in the letters can be expressed mathematically. Given that the size of the image may not be known prior to the search for the distinctive image, it is preferred that the mathematical components of the image be known. In a preferred form of the present invention, using the Color Method, the first color is selected (point one) and scanned until its termination, across any number of directions up to and including a 360° scan from point one to determine end points of the color. Thereafter, the distance is calculated between point one and the outermost end point in each direction scanned and the ratio of the distance between the outermost end points is calculated. With information, a comparison can be made of the ratio to predetermined known data for the distinctive image to determine the location of the distinctive image in the video file. This can similarly be repeated for a plurality of colors and for color ranges. Similarly, the distinctive image can also be identified by the Cluster Method (this method being used alone or in combination with the above Color Method) whereby data is selected representing a set of images within the digital video file; the concentration of similar pixels and the shape of such clusters of concentration of pixels is identified, and this concentration level and shape is compared to predetermined known data for the distinctive image to determine the location of the distinctive image in the video file.

Figure 5:
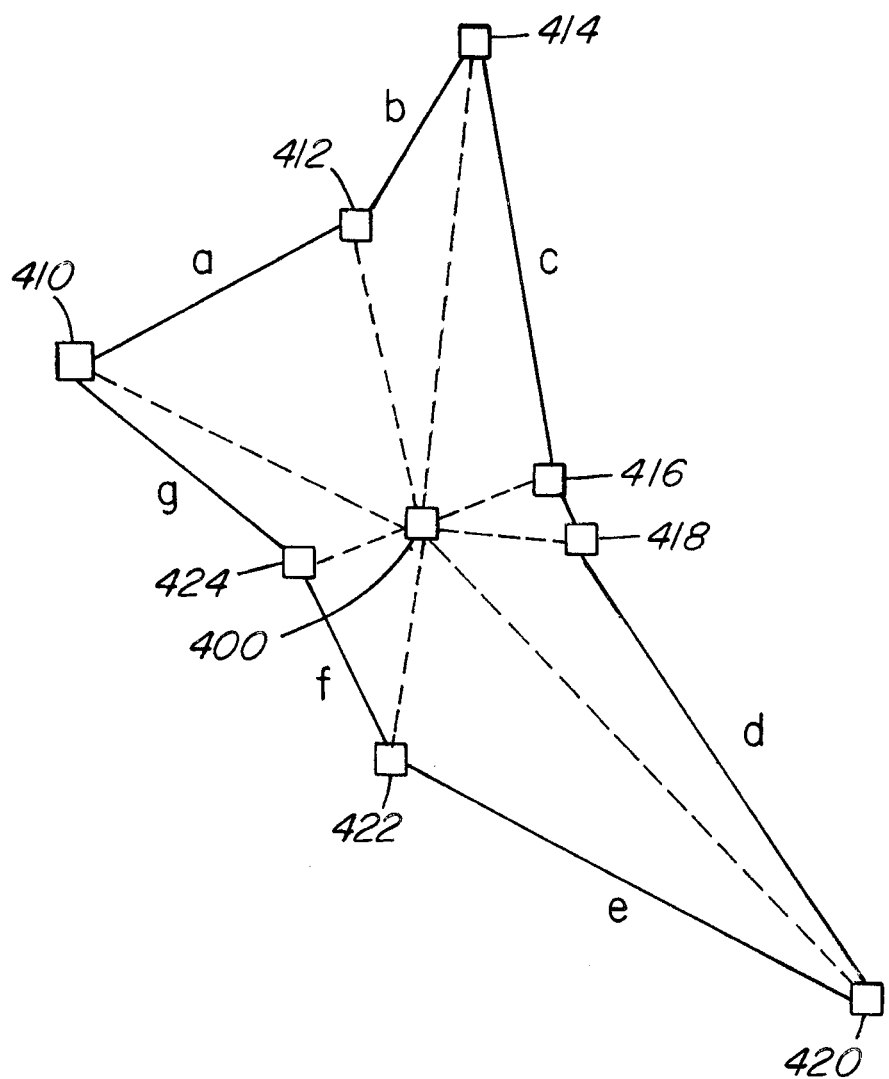
FIG. 5 is a graphic representation of one pixel processing and ratio determination in accordance with one aspect of the present invention.

FIG. 5 provides a simple graphic representation (via the Colour Method) of a processing of one colour pixel 400. Eight directional scans are performed, thereby measuring eight outmost end points or perimeter reaches of colour pixel 400, said end points being labeled as 410, 412, 414, 416, 418, 420, 422 and 424. The end points refer to the points at which colour changes from colour pixel 400, to some other colour. The distances between colour pixel 400 and each of end points 410, 412, 414, 416, 418, 420, 422 and 424 are only used to define those end points. More important is the measurement of the distances (a-g) between each of end points 410, 412, 414, 416, 418, 420, 422 and 424 such that ratios can be calculated.

The ratios to be used maybe a simple division of the distance between each of the points which in this example would result in 28 separate ratios. Similarly, depending on the type of distinctive image being searched this ratio may be more complicated where ratio is (1) a division of distances between combined points such as ratio of distance between the farthest and closest points which in this example would be 410 to 420 plus 414 to 420, divided by distance between 416 to 424 plus 422 to 418, or (2) a log scale comparison, or (3) multiplication of distances between points. The type of distinctive image and the relative difference in shape and color versus its background may determine the type of ratio employed.

Figure 6:
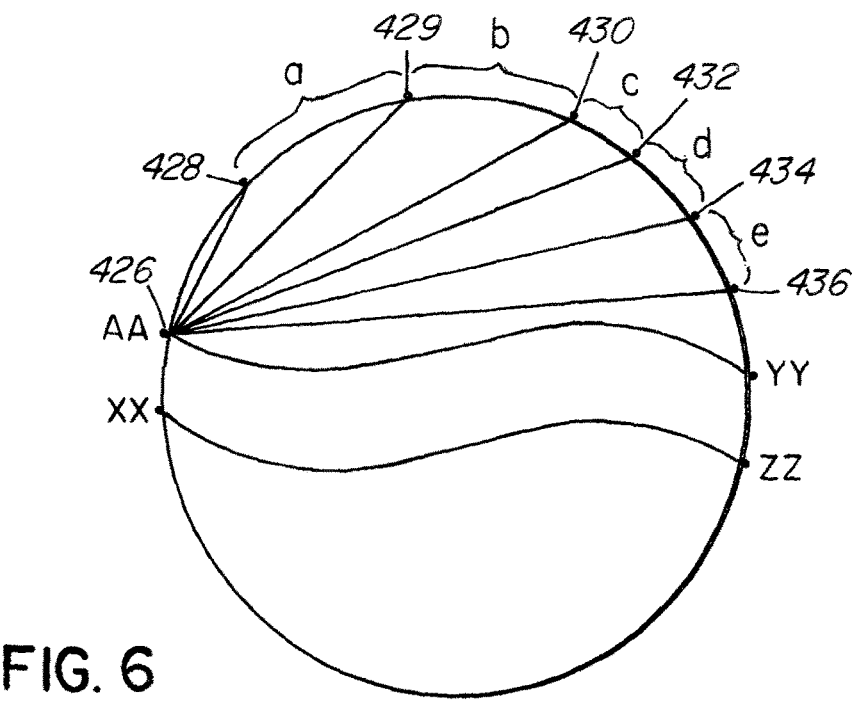
FIG. 6 is a representation of a Pepsi® logo.

FIG. 6 depicts the method in operation: the Pepsi® design logo comprises a distinctive blue and a red "half circle" with wave-like designs. Within a digital video frame, one may find a first colour pixel 426 and select a number of directional scans for colour end points, in this case, seven. This scan number is merely for explanatory purposes, as hundreds of scans could in fact be performed. Outermost end points 428, 429, 430, 432, 434 and 436 are identified, distances between them calculated (a-e) and then ratios determined.

In this example of the Pepsi logo, when only one color is analyzed to identify the distinctive image with a high probability the number of ratios to be compared will be significantly more than a similar image where two colors are analyzed since the ratios between the colors would enable quicker and more accurate identification of the image. So in this example of the Pepsi logo where one color is analyzed, numerous measurements will be taken of the radii and these divided with each other to ensure that the circular shape is within the typical tolerance of a digital representation of the logo. Secondly, the "wave' shape in the center part of the logo the ratio of the distance between points XX and YY, ZZ and AA, XX and ZZ, and YY and ZZ will be divided and these ratios compared with predetermined data.

Figure 7:
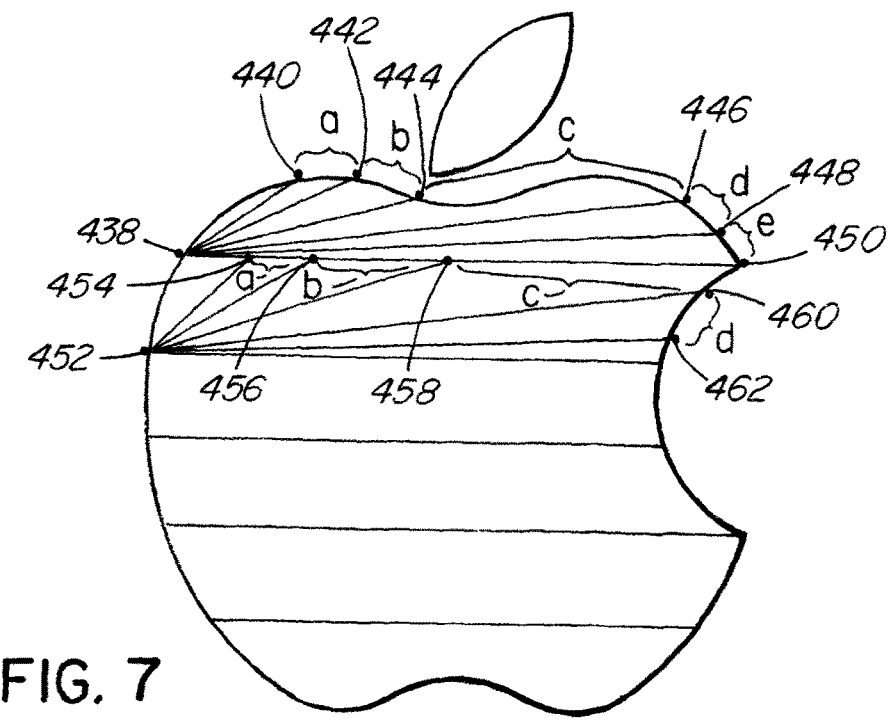
FIG. 7 is a representation of an Apple® logo.

FIG. 7 is illustrative of two colour processing using the Apple® computer design logo. First pixel one of colour one (438) is scanned to outermost end points 438, 440, 442, 444, 446, 448 and 450 (with distances there between the points shown as a-e). If the ratios of colour one did not provide the required degree of probability that the image is the desired image (i.e. the Apple logo), then a second colour (preferably an adjacent colour) is subsequently processed. First pixel one of colour two (452) is scanned to outermost end points 454, 456, 458, 460, and 462 (with distances therebetween shown as a-e). If the ratios of the second colour did not provide the required degree of probability that the image is the desired image (i.e. the Apple logo), then a third and/or subsequent colour (preferably an adjacent colour) is subsequently processed.

In FIG. 7, the ratios of distances between each of the outermost points (a, b, c, d and e for color 1 and f, g, h, l and j for color 2) would be compared to predetermined data for this distinctive image but, additionally, the ratio of distances between the points of color 1 and color 2 (i.e. the ratios of distances between a and f, b and g, c and h, d and i, e and j, and other such combination) are similarly compared to predetermined data to establish if this is the image being searched. Typically, cross color ratios would enable quicker identification of a distinctive image since the probability of cross-color ratios matching would be much lower than for a single color, and therefore provide a higher probability of the existence of the desired distinctive image.

Figure 8:
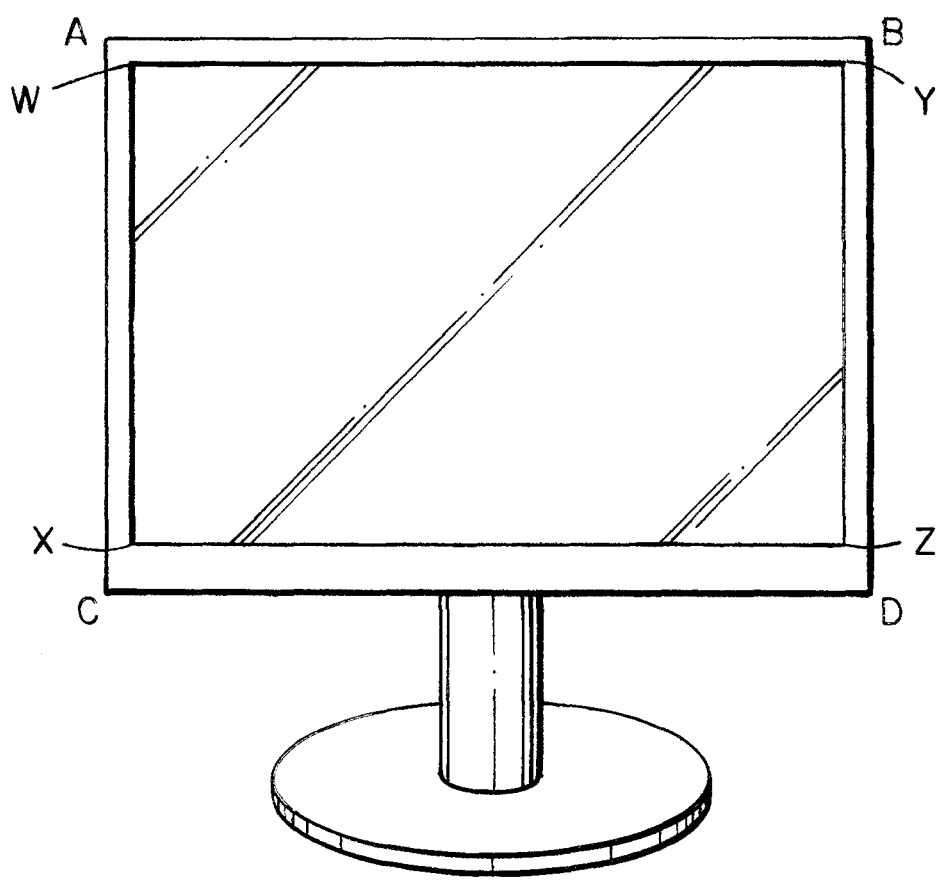
FIG. 8 is a representation of a Sony computer monitor.

In FIG. 8, depicting a Sony computer monitor, the ratio of distances between points AB, AC, CD, BD, would be divided by the distances between points WX, WY, XZ and YZ respectively and AW divided by BY and CX divided by DZ. These ratios would then be compared with pre-established data. Thereafter, the SONY logo may be analyzed using the Cluster Method and, again, the probability compared to pre-established data. The composite probability of these two methods will be determined and compared to pre-established data to determine the location of the Sony computer monitor.

The examples described above regarding FIGS. 6, 7 and 8, largely describe the Color Method. It is to be understood that, with the same examples as with virtually all distinctive images one could use any of the pixel based pattern or feature recognition protocols either or both of the Color Method and Cluster Method. Using the Cluster Method in FIG. 6 (assuming this figure is of a single color), the pixel concentration and shape data for such a single cluster would be compared to pre-determined data for such a distinctive image to determine if this is the image being searched. Using the Cluster Method with the Pepsi logo in FIG. 7 which comprises a red semi-circle with a "wavy" bottom positioned on top of a mirror image shape which is colored blue, the pixel concentration and shape data for the two colored clusters plus the white middle section would be compared to pre-established data for the Pepsi logo to determine if this is the distinctive image being searched.

Similarly, with the Apple logo in FIG. 8 which comprises 6 differently colored sections plus the additional $7^{th}$. section which is the green stalk, the pixel concentration and shape data for these 7 clusters would be compared to pre-established data for the Apple logo to determine if this is the distinctive image being searched. In the preferred embodiment of the invention, in all these examples both the Color Method and the Cluster Method would be employed individually with probability determined of the existence of the distinctive image being searched. In each case such probability would be compared to a predetermined threshold probability (as described earlier) and after the first of these methods and the second method is used, a composite probability would be used since this may increase the likelihood of determining the location of the distinctive image being searched. Once a single distinctive image is established as being in the digital video at the required threshold probability, this result could also be used to determine probability of a second but different distinctive image being in the same digital video scene e.g. if in a kitchen scene a white Bosch toaster oven is determined to be in the video and if a subsequent search indicates existence of a second Bosch appliance (like a coffeemaker or a microwave oven) in the scene, then the probability of the second, third or more Bosch appliances being in the scene would be higher especially if all these appliances are of the same style.

In FIG. 3, one is searching for a T shape image where the two stems of the T have a different color. If a pixel 50 with the appropriate color or in a range of colors is located by sampling within the data set, as shown in FIG. 3A, the pixel having the color within a certain range of values (for example to account for differences in shading and lighting), a search is conducted in several directions along the perimeter of the area with that color, as shown in FIG. 3B, from that pixel to determine the boundaries of the color (step 220) by determining when the color changes. This allows the system to determine the outermost points in at least the four primary directions, of pixels of that color form. The distance between such points is calculated and a ratio between the distances is determined. This ration is then compared with pre-determined data for specific distinctive images. Similarly, the second stem of the "T" would be searched starting with the pixel of the appropriate color.

The system then determines if the distinctive image is present by checking similar distance and ratio data for other colors and components (step 225) of the distinctive image. After such distance ratio is determined for each color of the distinctive image, a probability that a particular distinctive image is present is calculated (step 228). If this probability exceeds a predetermined confidence level, the system acts as though that distinctive image is present in the frame.

In using the Cluster Method in FIG. 3, the search would first separate out the pixels of a single or range of colors. It would then compare the concentration of the pixels of such colors and shape (FIG. 3D with the two bars 30 and 35) with predetermined data (in this case the shape T) for such an image to determine the probability that a particular distinctive image is present is calculated (step 228). If this probability exceeds a predetermined confidence level, the system acts as though that distinctive image is present in the frame. If both the Cluster Method and the Color Methods are used, then the system would calculate a composite probability which if it exceeds a predetermined confidence level, the system acts as though the distinctive image is present in the frame.

These relationships are used for determining the presence of a particular distinctive image. Text, for example, will typically be of a similar size and color, and have certain relationships (e.g. a "T" includes a perpendicular line bisecting a horizontal line from below). All distinctive images, be they products, trade-marks, text, street names, retail store fronts, billboard advertisements, or others, can be represented by such relationships. Likewise, the relationships can be varied depending on the positioning of the distinctive image in the frame (for example the "T" could be positioned upside-down).

Once the various components of the distinctive image have been located, the size of the distinctive image can be determined.

The system also determines the surroundings of the product, also known as part of the "context" of the image, for example if it is held by an actor, or is on a kitchen counter, or is on the floor, or is on the wall, or is in a garden, on the street, or on a billboard, etc. Knowledge of the product's typical surroundings can be incorporated in the analysis, for example toothpaste is normally found in a bathroom, perhaps on a counter or sink, a toilet bowl is normally found in a toilet or a bathroom, or A car next to house with t shaped road is likely to be a driveway As used herein the term "context" means the set of circumstances or facts relating to a particular image. Again, a probability will be determined for the location of the scene or context in the digital video image and this will be considered present if it meets the pre-established required level of probability.

Once the scene or context and its characteristics are determined from the various distinctive images located, the system would identify places in the data where a product image may be added. For example, if the system determines a kitchen sink and an adjacent counter is present, a food product can be added. Likewise, if a bathroom counter is determined to be present next to a sink which can be identified due its distinctive characteristics of the shape of a bowl and taps, a tube of toothpaste, a container of shampoo or a bar of soap can be added without interrupting the continuity of the video.

The system also determines the variances in the distinctive image (step 235) while determining the boundaries. For examples, these variances may include lighting elements, positioning (for example the angle at which a product is displayed, and blocking elements (e.g. fingers around a portion of a can).

The system may then select to place or substitute a product image in the digital video file based on predetermined criteria (e.g. place images of Tropicana Orange juice carton in all kitchen scenes on a kitchen counter adjacent to a refrigerator assuming no conflicting brand image is already there or substitute all orange juice brand images with that of Tropicana). The context variables, such as size, packaging, lighting, positioning, blocking and other elements of the context and the precise location are applied to the substitute image.

For the digital video file data representing time following, and optionally, time preceding, the substitution is made, until the original distinctive image is no longer present in the file. The system must make allowances for movement of the trade-mark in the frame (either as background relative to the camera, or because the product is being moved) and for temporary blockages of the product (e.g. an actor moving in front of the trade-mark and temporarily removing it from a series of frames).

The placement of a product image may be made prior to the video being displayed, so that the video file received by the user, may be the altered video file.

Within a plurality of video segments, (within television shows and movies or via digital internet content), there may be a television screen behind some actors. It may be desirable, to have a commercial for a product such as Coca Cola® or Crest® toothpaste or a Ford® vehicle inserted on that screen, to be playing during a scene. It may be desirable in some markets to have an advertisement of one product while in another market, the focus may be entirely different such that ease of 1) identification and 2) adaptability of image/object manipulation is the key.

In accordance with this invention, a digital video is usually analyzed frame-by-frame based upon at least one type pixel-based pattern/feature recognition protocol. Initially, the frames undergo preliminary analysis in fixed intervals, preferably at least every $20^{th}$ or $30^{th}$ frame in order to reduce processing time and to determine where there are significant changes in content location or physical scene layout. Once a scene is identified with an item that has minimal significant content changes, than the intervening frames between the two frame markers are reviewed in finer granularity to determine precisely when and where the item in the frame occurs.

The resulting selected section of video produces one contiguous scene known to contain the item, and must undergo analysis in greater detail. In the first frame of this scene, under this invention, the perimeter of a frame or other extraneous sections of the frame are excluded depending on what item is being identified. For example, if one is searching for a table or a computer/TV screen, this analysis most preferably starts with a scene analysis.

Preferably, part of the method as described herein employs a statistically derived visual vocabulary to classify a video's "scene context". This is done to improve computational feasibility of item detection routines, and ensures a detected item is consistent with the context of the video it which it appears. For example, a BMW® car would likely be correctly detected on a city street, but is unlikely to occur with correct scale in an indoor environment like a kitchen. Thus, we can limit the number of stable ubiquitous search items based on the videos general location.

The item detection routine may use featureless geometric surface hypothesis models, contour analysis, or common feature matching based algorithms. These approximation models are checked for match consistency, abnormal structures, and inferring object pose. Therefore, a frequency of occurrence for stable item positions is formed over intermittent non-linear video segments, and the continuity of modified video clip content remains undetectable.

There are at least two ways in which exclusionary judgments are made and used:

1) basic context analysis: if the object to be located is a table, and environs appropriate objects are detected around or on it, the probability increases that it is a table and not a carpet. Likewise, if one is searching for a table, one can remove from the analysis extraneous objects or images such a floor and ceiling, as the table will most likely appear between the two.

2) scene context: determining if a scene is outdoors or indoors by acquiring scene specific cues such as whether the scene has typical outdoor items such as forests, roads, snow, cars, etc. and if indoors whether it contains distinctive indoor objects and cues, such scene context allowing an increase in probability of degree of confidence as to location of object.

Using these cues, one may for example, in locating a table, make an assumption that such an item typically tend to be in the frame space between the ceiling and the floor in a room. By first excluding the perimeter of the room i.e. ceiling/floor, one can focus on the items in the center of the frame for analysis. This is done to minimize processing of extraneous items to improve performance. Alternatively, if the scene context is focused on something on a table region than the scene content would be predominately covered with the table surface with little else showing. Thus, the above procedural analysis approach would exclude the extraneous sections, and quickly infer the contiguous surfaces occupy most of the frame.

Once the analysis concludes the existence of a desired item in a scene, than this item is tracked in subsequent scenes to determine how long the item is in the full video, movement of the item, changes in the characteristics surrounding the item (i.e. other associated items in the vicinity, lighting/shade changes, partial or full view of the desired item, etc.). Analysis is done by looking for finer granularity details of the item from scene-to-scene, predictive tracking of item in future frames/scenes by movement coordinate correlation filters based on the Rudolf E. Kálmán 1960 dynamics model.

The method and system initially identifies a video segment, frame sequence, or image area to be modified. The precise coordinates in each frame undergo further analysis in greater detail to better define a region to be modified.

"Manipulating" with respect to an image means adding, removing, or otherwise modifying an existing image, in whole or in part. Preferably, an image may be is selected from the group consisting of digital or media display devices, computer monitors, laptop computers, tablets, Smartphones, electronic devices, walls, tables, floors, counters, and televisions such that insertion and substitution of product and service brands may be appropriately targeted.

Within some aspects of the invention, it is preferred that adjustment features are acquired from original digital video creator.

It is preferred that the image replacement, removal, manipulation or addition steps are carried out by a computer displaying or conveying media file. It is also preferred that said steps are carried out by a server storing said digital video file. It is further preferred that said steps are carried out by a computer receiving said digital video file from a server and transmitting said digital video file to a second computer.

It is preferred that the digital video file, as used herein, is in post-production. It is also preferred that further a step comprises calculating a probability (X) that a geometric model so formed represents the desired object/image. It is preferred that the method additionally includes a step of manipulating the digital video file by means of at least the following steps which comprise: based on the comparison, calculating a probability that the geometric model so formed represents the desired object/image; and if the probability exceeds a confidence level, manipulating the digital video file by a means selected from the group consisting of altering, adding to and/or deleting (in whole or part) an image of desired object.

It is preferred that the image of desired object is altered by substituting a second image or by adding thereto or thereon a second image. It is further preferred that an image which replaces or supplements the desired object is a product which is altered by substitution for a second image of a second product. It is preferred that the desired object is a product which is altered by addition of data representing an image of a related product to said data representing a frame. It is most preferred that desired object is not deleted but is supplemented with an image of a an alternative object/image, such as, for example, supplementing an image of a computer screen with a sequence of images comprising targeted advertising or substituting Coke cans and Pepsi cans.

It is preferred that the digital video file is streaming video and that the steps are carried out by a computer displaying the digital video file. It is further preferred that the steps are carried out by a server storing said digital video file and that the steps are carried out by a computer receiving said digital video file from a server and transmitting said digital video file to a second computer.

It is preferred that part of the method of the present invention is applied to a video before such video is uploaded by the original creator/publisher/producer to a central computer library or network for distribution to numerous viewers. It is preferred that the further steps in the method are undertaken at the central computer prior to a viewer requesting downloading of such video for viewing. It is also preferred that the method is carried out by a software program product.

It is preferred that once the image/object has been identified with a desired degree of confidence, there comprises an additional step (or steps) of altering, adding to and/or deleting ("manipulation, as broadly defined herein) the identified image/object, wherein said manipulation is based on a history of purchase behavior of a user/viewer of the digital video. In a preferred form, part of the method of image/object identification, and then image manipulation is done before the video is uploaded by the original publisher of the video to a central computer library for distribution to numerous viewers and the remaining part of the process is done at the central computer prior to a viewer requesting downloading of such video for viewing.

Use of Image Insertion and Alteration

It is to be understood that there are a variety of different ways for images to be inserted into the digital file once the target point(s) of insertion have been identified in accordance with the preferred aspects of the invention and the present claims are not limited to any one such insertion method. Exemplary methods of insertion include those developed by the present applicants and are covered in US Patent Publications 2011/0170772 and 2011/0267538, the contents of which are fully incorporated herein by reference. It is to be understood that such methods allow seamless insertion desired images.

There are many reasons why a party may wish to use the system and method described above. A major reason would be placement of product images in a digital video so that it looks like the product was filmed originally during video production and provide an implicit way of advertising for the brand. Another reason would be a trade-mark owner may wish to substitute a more current trade-mark for an older trade-mark. Likewise, substitutions made on the geographical availability of a product may make it desirable to change trade-marks. A particular market strategy, for example the promotion of a particular brand, may also make it desirable to change trade-marks.

Alternatively, the copyright holder of the video may want to place or substitute trade-marks based on which trade-mark owner provides the holder with compensation. In the same vein, trade-mark holders may pay ISPs or other routers of the video to have their trade-mark or associated product substituted for a competitor's trade-mark or product.

A trade-mark can simply be removed, and substituted with the background colour of the associated product (this is particularly useful if the trade-mark holder is no longer compensating the video maker). Alternatively, something can be added to the video relative to the distinctive image, e.g. a new design element can be added adjacent to the product image that is placed in the video. Alternatively, a complimentary product may be placed adjacent to another product that is originally in the video or is placed by the system (e.g. dental floss placed adjacent to toothpaste).

Another use of altering images is change sizes of products identified as distinctive images in a digital video. For example a six pack of a brand of cola could be substituted for a single can, if the can is resting on a kitchen counter. Likewise, a six pack could be replaced by a case of 12 cans, or a billboard advertisement could be replaced with a different advertisement.

Another example of use of the alterations is to place vehicles along an empty road side. A video may show an empty curb into which a vehicle could be place. A billboard or a poster on a wall may be added to a digital video file, as could a television screen showing an advertisement. A screen saver or a moving image could be displayed on a computer screen that is off in the original video.

Once a desired or distinctive image is identified, it can also be changed, for example made brighter, bigger, or otherwise enhanced, or made less conspicuous, e.g. duller or smaller. This can be accomplished by changing certain pixel values for the pixels associated with the distinctive image. Such modifications are fully within the purview of the term "manipulation", as defined herein.

Besides using the geography of the viewer to make alterations in the video (described further below), the actual geography of the video could be changed. For example, license plates of cars in a video file could be altered to fit the state or province of the viewer. Flags could be changed to reflect the nationality of the viewer.

The demographics of the user may also play a role. Alterations featuring products for older consumers may be targeted to same. Likewise, toys, or other products for children may be appropriate additions to a children's room in a digital video.

The manipulations/alterations can also effect the equipment appearing in the video. For example, a particular cellular phone could be substituted for another, or placed into appropriate surroundings such as a bedroom or office.

The desired images, once located, can also be used to determine scene context. For example, a trade-mark may be used to identify a product in a kitchen (e.g. a dishwasher). If room is available, another product can be placed near the located product (for example a water cooler).

An example in an outdoors based digital video may involve as key aspect and use of streets. If a street and city can be identified, the confidence level of the distinctive images found can be vastly improved. For example, if it is known that on $1^{st}$ Avenue of a particular city, there is a certain restaurant, if the system locates a street sign $1^{st}$ Ave, and an image that may be the name of the restaurant, the confidence that the restaurant is name is present can be greatly increased. Likewise, once a street is located, it may be possible to add vehicles, store fronts, billboards and other images.

The context can also be used to identify the location of the viewer. For example, if the viewer is receiving the video on a cellular phone or PDA, their location can be determined. This in turn, can be used to decide how best to alter the image.

Use of Database

Information may be gathered during the identification alteration process and stored in a database associated with record 600. For example, record 600 may include distinctive images located within video file 500. This can allow, as discussed previously, for easier location of certain distinctive images within the video (a distinctive image within the video can even be associated with certain start and end times, or with a shading or coloring modifier). Other information such as the location of the digital video, or a record of the alterations made in for the video (for example a record of trade-marks inserted into the video) may also be associated with the video.

The records could also contain information about the viewer or viewers of the video. For example, if the video is widely available via the Internet, the record could contain an aggregate or summary of information about the viewers, such as location, age, and other demographic information.

This system could also include data on actual purchases of products made by the viewer through data obtained from, for example, scanners in supermarkets and similar systems in other types of stores and from other sources. For example, if in week one the system knows that a particular viewer had purchased a 12 pack of Coke from a supermarket and is a regular purchaser of Coke, then the system (assuming its customer is Pepsi) may place product images of Pepsi in appropriate scenes in videos watched by this viewer in week 2. Similarly, per data obtained from Facebook or other similar Internet sites indicates that a particular viewer has recently joined a fitness program and the purchase data for this same viewer shows a loyal Coke user, then the system (if a customer desires) could place image of Diet Pepsi in the videos viewed by this viewer.

This information about the viewer and about alterations to be made may be used to send incentives to the viewer. For example, before or after the video a link to a coupon for a product appearing in the video may be presented.

As such purchasing preferences of the viewer may preferably be obtained from, store scanners, loyalty cards, and data mined from cues acquired from viewer's social media inputs, responses and profile(s).

The record may obtain information from server 200 or computer 100 and store such information in record 600. Particularly valuable information to advertisers may be the location the video file 500 is being downloaded to. For example, using a smart phone with a GPS system, server 400 could determine that the user is in a grocery store. If the user is in such an environment, certain alterations to video file 500 become more valuable, for example the substitution of images or placement of images for products sold in that store. Likewise, if the user is on a street, substitutions for storefronts on that street are more attractive to advertisers than would more distant locations.

The time a digital video file 500 is accessed may also be an important consideration. For example, a late night download indicates certain viewing preferences of the user, whereas a daytime download may indicate a work based user.

Video files may also be flagged for manual review for quality control, as described further below. For example if the confidence level of a distinctive image is above a certain threshold, but below another threshold, the video provider may prefer that the video file be viewed prior to being transmitted to a user. This may be done using crowd sourcing or other such techniques wherein a plurality of trained agents view the video files and the manipulation made. From a commercial perspective, these agents will be trained and available on demand online to perform the quality control functions.

The identification of distinctive images in a video file can be used to determine context. For example, if multiple kitchen appliances are located (for example a fridge and a dishwasher), the likelihood of the images being set in a kitchen is increased. Likewise, if a number of automobiles are located, as well as store names and a street name, the context of the frame is more likely to be a street. Therefore, as a number of distinctive images are located, it becomes easier to determine the context of such images.

Using the distinctive images located in a frame, a probability can be assigned to a context, for example that the setting of the frame is a street or a kitchen. If the probability is above a predetermined threshold, then the context can be associated with the frame, and if the probability is below a certain threshold, the video file can be flagged as such at that frame, until confirmed by a user or administrator.

The database may have access to a library of images. These images can include products, such as automobiles, which may be rendered in three dimensions. The images can also include contextual elements, for example the layout of a hotel room. In this example, once a hotel is identified by its trade-mark or by text within a frame, a map of standardized hotel rooms for that particular hotel can be accessed and used to provide context. A factory floor can be identified and used in a similar context.

The lack of certain distinctive images can also be used to assist in determining the context of a frame. For example, if the trade-mark of a hotel is located, the setting of the frame, if indoors is likely to be within the hotel. However, if a number of bottles of alcohol are present, and no bed is present, it becomes more likely the frame is set in a bar rather than a hotel room. If a bathroom is present however, the probability that the setting is a hotel room increases.

Also, the system may have access to purchase behavior information based on the computer 100's past purchases. This information can be used to determine appropriate advertising for that computer, and therefore assist it making an appropriate alteration. Full analysis of this video, or at each intermediate stage, one would have a full picture of content items, and where such items occur in the video, spatial analysis of where there are likely (based on a reference list) instances to place a product or an advertising message in the video. Once this is determined, a product (like a can of Coke) or an advert (like a full video advert of Coke is played in a TV or a computer screen in the background of the video with or without any changes to audio, a screen saver on a TV/computer screen, a poster on a wall in the scene, or a 'tank-top" is placed on an appropriate table in a scene).

Such video may be viewed on a mobile device like a Smartphone or tablet, on a laptop, a desktop computer, or another type of a computer display device on a TV screen which has some device like a cable set-top box, a programmable video recorder (PVR) or modem, to enable data and/or video communication, and/or software execution.

Such a video may be altered for reasons such as advertising (placement, removal or replacement of posters, product images, pictures, or other such items to advertise a product in a video scene) placement of a product image in such a video. This may be at the request of an advertiser or a video producer. One primary purpose for altering the image at the point of downloading is to enable advertising or product placement to be targeted to viewers based on a viewer's internet and product purchase data. As an example, if a viewer is a regular diet Coke® user (as evident for purchase data of such viewer obtained from supermarket scanners) or Facebook® data shows that the viewer has recently started a fitness program, then an advertiser may wish to place a can or a package of diet Pepsi® in an appropriate scene in a video being viewed by such a viewer. This would also include removing any conflicting or competing products that are shown in the original video.

Figure 4:
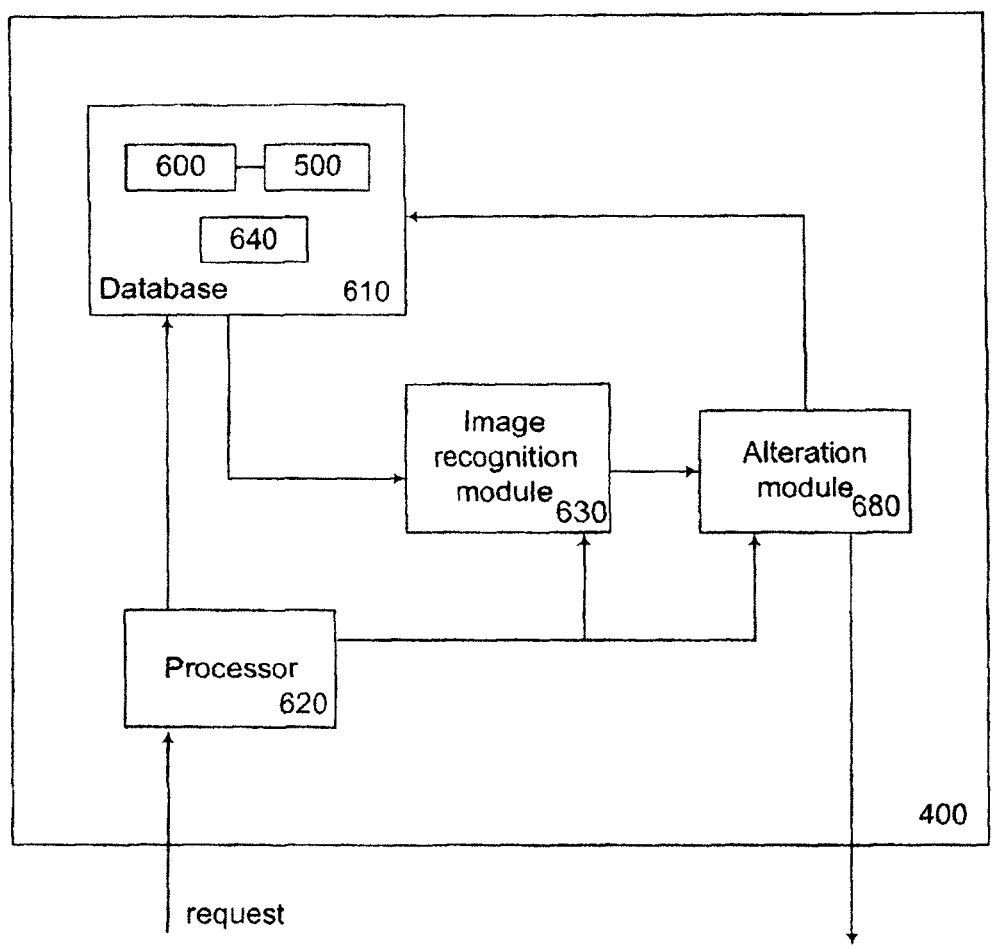
FIG. 4 is a block diagram of software embodying a method of a carrying out the invention.

As shown in FIG. 4, the process by which distinctive images are located, video scenes/content identified and product images inserted in digital video file 500 can be done in a computer, such as server 400. A request for digital video file 500 reaches processor 620 in server 400, and database 600 is accessed to obtain record 600 associated with digital video file 500.

The method of inserting product images and otherwise altering digital video images in server 400 can be carried out by a series of modules, which may be implemented in hardware or software. Image recognition module 630, accesses database 600 to obtain image data according to rule set 640. Rule set 640 provides instructions to image recognition module 630 based on information about digital video file 500 and other relevant information such as information about the requestor, and the time of day and address. The instructions from rule set 640 include information about which distinctive images to search for. Image recognition module 630 then scans digital video file 500 for such images and reports to alteration module 650 regarding the success of such scan and where the distinctive images are located in digital video file 500.

Alteration module 650 provides information to rule set 640 regarding the distinctive image found, and based on instructions from rule set 640 alters digital video file 500 accordingly. Several alterations to digital video file 500 may be made, depending on the distinctive image located, and the number of distinctive images located. After being altered, the altered digital video file 500 is sent to the requestor, and it may also be saved in database 610.

The present methods, systems and articles also may be implemented as a computer program product that comprises a computer program mechanism embedded in a computer readable storage medium. For instance, the computer program product could contain program modules. These program modules may be stored on CD-ROM, DVD, magnetic disk storage product, flash media or any other computer readable data or program storage product. The software modules in the computer program product may also be distributed electronically, via the Internet or otherwise, by transmission of a data signal (in which the software modules are embedded) such as embodied in a carrier wave.

For instance, the foregoing detailed description has set forth various embodiments of the devices and/or processes via the use of examples. Insofar as such examples contain one or more functions and/or operations, it will be understood by those skilled in the art that each function and/or operation within such examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, flash drives and computer memory; and transmission type media such as digital and analog communication links using TDM or IP based communication links (e.g., packet links).

Another embodiment of the present invention is a method useable at a "front-end" by a user (for example an advertiser) to identify images and/or objects within a digital video file for the purpose of alteration or modification. More specifically, there is provided a method of identifying distinctive objects or images within a digital video using at least one type of pixel-based pattern/feature recognition protocol, as described in more detail herein.

Preferably, by using a front-end computerized method and system, a user receives and responds interactively online to a plurality of questions relating to the desired image and its characteristics, its environs and the video as a whole. A user decides and instructs on the criteria of how and where an image of a product or an advertisement is placed in a video. As an example an employee of an advertiser like Pepsi may review some videos by categories and characteristics, and provide product or advertising image insertion criteria e.g. type of scenes that should contain the placement (e.g. in kitchen scenes only), use certain size, packages and colors of products placed, confirm or provide guidelines on placement image appearance, etc. In one case this would be done in a controlled manner whereby the advertiser would be asked very direct questions on placement criteria hereby the questions are created such that the answers thereto are direct and binary: preferably yes or no. In this manner, identification and thereafter manipulation can be done quickly and effectively.

In another context, this invention provides a method of tracking and monitoring online digital videos with a demonstrable and high level of popularity (referred to as "viral") which comprises:

(a) providing a user with an interface, said interface providing data to the user relating to at least one viral video;

(b) providing a plurality of questions answerable by said user, said questions including those relating to one or more characteristics of an image desired to be manipulated (the "desired image") with said viral video;

(b) searching a viral video for the desired image, said searching for the image being based upon at least one type pixel-based pattern/feature recognition protocol and identifying a proposed image match to the desired image;

(c) statistically verifying that the proposed image is the desired image; and (d) manipulating the desired image by way of an action selected from the group consisting of: deleting the desired image, replacing all of the desired image with an alternative image, replacing a part of the desired image with an alternative image, adding at least one feature to the desired image, and altering an environment surrounding the desired image.

Preferably, there is provided an advertiser interface on online videos that become viral videos. If the viewership data trends in connection with an online video indicate that the level of viewership is rapidly rising, advertisers may be notified or targeted such that he/she could benefit quickly from a product placement or advertising via the identification and manipulation method as described herein.

Quality Control

Since analysis and additional object/item placement may be inaccurate, it is preferred that the final step in the method of the present invention would comprise a) reviewing (via a human subject) a manipulated video file, data and information related to the desired manipulation; and b) assessing the accuracy of the manipulation (hereinafter "quality control or "QC"). Further such QC may comprise classifying the video file.

The present invention provides a method of creating a quality control reference database for use in verifying accuracy of a desired image manipulation in a digital video file comprises:

a) causing at least one human subject to view a video file which is a target for manipulation and wherein human subject is provided with data relating at least to one of the desired image and its environment and a proposed image; and b) causing human subject to assess accuracy of the manipulation (hereinafter "quality control or "QC") by way of comparison between the desired image and the proposed image;

wherein the desired image was searched and located based upon at least one type pixel-based "pattern" or "feature" recognition protocol and the proposed image was identified as a purported match to the desired image Thus, one or more person(s) on one or more computers confirms the identity of one or more items, and or the accuracy of additional item placements. The check is done either at each stage of the analysis or only on the final modified video produced. In addition, the human QC process would provide validation data for future reference whereby such data is used in future analysis to improve the identification accuracy of the automated computer analysis.

So, it is preferred that there is a final analysis before image manipulation or immediately thereafter, by human eye/human QC, thereby producing "human QC data". Such human QC data (either confirming or denying accuracy of object identification) may be collected into a reference database. This reference database may be used to improve probability of future computerized identification of like images/objects and quality of image placement or alteration. In other words, such accumulated data in a reference database will become another layer in a series of checkpoints or steps, each sequentially increasing the likelihood of accurate object/image identification.

Within the scope of the present invention image identification may be preferably made either at the server where the original video is stored, at the computer or device that the viewer is using to view the requested video, at an intermediate point or at multiple points/computer processors in such a network. Such identification (and possible latter alterations) may also be made, at the same time or at different times, not only in one process but in multiple sub-processes in multiple computing devices in such a network Preferably, on these "back-end' of the identification and manipulation protocols, as described herein, there is provided a method and system of QC, preferably human QC so that the advertiser has certainty with regard to image placement appropriateness, given the overall automated nature of the identification and manipulation method and system of the present invention.

A preferred QC analysis would enable the selection of the appropriate frames from the video and determine the questions that have to be answered by a quality control person. As an example, if the analysis under this invention has determined the existence of a table in a kitchen scene and a can of Tropicana orange juice is to be placed a few inches from the edge of the table in a corner of the table, then the quality control person or persons shall be shown, as appropriate, one or multiple frames of the relevant scenes and be asked specific questions to determine of the analysis and placement is accurate. In order to prevent errors resulting from human perception and interpretation, such quality control questions would be asked on the same video and placement to one or more quality control people and the answers compared to improve accuracy.

All the data obtained from human review would then be input into the overall video analysis and placement system to improve the future analytical accuracy of the overall system. In the above example of a table in a kitchen and placement of some sample products like aa Tropicana® orange juice can, the questions asked of maybe two or three independant (i.e. answering questions independently without knowing the answer from the other quality control person) quality control staff would be as follows:

After showing a frame of the kitchen scene at the start, middle and end of the scene, ask the question: is this a kitchen scene? If, by way of example, all three QC subjects (probably based in different locations to get more independent answers), provide the same answer, then that would be considered as a correct answer. If this scene is confirmed to be of a kitchen, then the system would ask the second question shown below.

The second question (after displaying the video frames showing the table) would be confirm that is a table. Again if this is confirmed, the system would proceed to step 3. Again after showing frames with the Tropicana can and other sample products, the questions would be to show the appropriate frames and obtain confirmation of accurate placement.

Besides the above three questions, the system based on the computerized analysis of the digital video and the resulting probabilistic estimates, there would be several other questions relating to the view, appearance, angle, lighting, color and other such features of the kitchen, the table and the Tropicana can to ensure that the placement location and appearance is as required by the advertiser. Lastly, in this example all the answers from the quality control staff that confirm, reject or otherwise indicate a difference versus the analysis of the computer analysis and placement, would become part of a learning algorithm to improve future analytical accuracy and placement.

More specifically, it should be noted that, with regard to QC questions on placement, since placement of product and advertising in a digital video will likely and mostly be done at the point of downloading since then the placement of a particular product is based on the internet and/or purchase data of a the viewer at the time (i.e. if a viewer is a regular purchaser of Coke, then the advertiser may want to place a Pepsi product or similarly if on Facebook a viewer has been discussing joining a fitness center, then, Pepsi as an advertiser, may wish to place a Diet Pepsi can in the video.

The above method of QC could also be employed at the point when the video is uploaded to an internet site for distribution thereon. In this case the video being uploaded would be analyzed, immediately when it is uploaded, by the computer program as described in this invention by the person uploading the video (which likely would be the producer of the video) and the person would be asked several quality control questions (similar to the questions described in the above 3 paragraphs) so that the accuracy of the computer analysis is confirmed or any differences noted thereto. Furthermore, such answers by the uploader may also be checked, to verify accuracy, by a quality control person as described above.

Searching and Social Media

In another embodiment of this invention, data from reference database is used to direct an image manipulation. The present invention provides a method to identify and substitute images in a digital video file, based at least in part on an internet and purchase database of a viewer of said video file, said database comprising data obtained and/or mined from one or more of the viewer's internet search history and the viewer's social media profile, commentary and preferences, which method comprises: a) acquiring information from an internet and purchase database, thereby to identify interests of a viewer b) identifying within the video file i) a product or service relating to the interest or ii) a opportunity for promotional alignment with the interest; c) manipulating the video file based on the interest.

As used herein "internet and purchase database" comprises data obtained and/or mined from one or more of:
a) a viewer's Internet search history i.e. both text based searches (e.g. conventional Google search) and visual information based searches (e.g. Google Goggles) and social media (e.g. FaceBook®, LinkedIn®, Google+® etc. . . . ); and
b) data relating to a viewer's purchase behaviours and history.

Such an internet and purchase database may be used not only, as noted above, to target placement of products or advertisement in the video, but also to determine (in broader strokes) the type of scenes that are popular with a given viewer. If it is determined that a viewer is more interested in certain scenes, due to personal interest, then that scene or type of scene would be manipulated to provide more advertising exposure. For example, if a viewer tends to search frequently for kitchen or cooking related items on the Internet (indicating an interest in cooking and kitchens), then for such a viewer, the placement would be biased towards kitchen or cooking related scenes. However, if a viewer does not show such bias in the search activity but does show such bias in the viewer's Facebook data, then any videos viewed by the viewer on Facebook may be similarly targeted for placement.

The present invention further provides a method of targeting images to a viewer which comprises:
a) acquiring and analyzing a profile of online activity of the viewer;
b) applying the reference database of claim 46 to the profile of online activity of the viewer to identify aligned target opportunities; and
c) based on the aligned target opportunities, supplying a new image to the viewer.

More specifically, in this embodiment, the objects or scenes, identified under this invention, in digital videos can also be displayed to a viewer when such viewer is conducting a search on a search engine (text or visual information based) for such or related items or scenes and/or when such an item or a scene is discussed by a viewer with friends on Facebook or other social media sites. Such video images displayed to a viewer are from the reference database, as defined above. For example if an internet user is searching on Google for a particular type of a telephone that is more used in kitchens and at home then, for example, in offices, then besides displaying the normal search results, there could be a small window showing the video with the relevant item that a viewer can click on to watch swee the fuideo. This would enable a person to see the relevant telephone in a real-world environmet.kitchen. Similar user on Facebook is enquiring or discussing with friends about such a telephone, then this video could be displayed in small window on the screen for the user to click on if the user wants to view the video.

In the above embodiment, the invention involves maintaining an inventory of every scene and object identified in digital videos (reference database). Thereafter, in response to data from search (e.g. on Google, Yahoo or other search engines) or social media (e.g. Facebook, Google Plus, Foursquare, etc.) activity of a user, the video of the scene or object most applicable to such a viewer's search or social media activity would be displayed on a screen (in whatever manner appropriate i.e. a full, partial, or a small window in a screen, by words to click on, etc.) for the viewer, if so desired, to click on or watch to get a pictorial indication of the subject item ("pictures say a thousand words").

The above embodiment would also enable the system to provide the viewer an opportunity to place products or advertising in a video based on data obtained from the viewer's social media or internet search activity (internet and purchase database). For example, if a viewer is arranging a picnic on a particular beach (Beach X) with his or her friends on Facebook, and the reference database comprises avid that particular beach, then the viewer could be provided an opportunity to place duct or even place the pictorial representation of the viewers friends on the beach. This could be done in a very controlled manner (i.e. the software on which system operates provides automatic insertion and methodology) so that the scene or video that is distributed by the viewer to friends has the images of the friends and some prescribed products (e.g. a 12 pack carton of Coke) in the scene of Beach X. The advertising value of this would be very significant to advertisers since this would involve the viewer to actually be involved selecting and placing a product in a video, and optionally having promotional products placed along side regular items like a BBQ grill.

In another embodiment of this invention, scene selection and placement of products or advertisement would also be determined based on the geographic location of the viewer and the type of computer device being used by the viewer. This is particularly important depending on the viewer being in an office, at home or using a mobile device outside. The location of the viewer at the time and the device being used to access the Internet would be determined from the IP address of the computer, data available from the viewer's Internet Service Provider, the address relating to the WIFI network (or other wireless network) that the viewer is using, the mobile device, provider and network that is being used, the GPS location (if the viewer's device has a GPS system), etc. Once the location of the viewer, the trajectory of the viewer's movement, and the type of device being used by the viewer is determined, then scene selection and placement could be targeted accordingly.

As such, the present invention provides a method to identify and substitute images in a digital video file, based at least in part on geographic location of a viewer of said file which comprises: a) acquiring information regarding the viewer's geo-location, thereby to identify a "target geography profile"; b) identifying within the video file at least one geographic specific image; c) substituting the original geographic specific image in the video file with an image related to the viewer's geo-location; and wherein searching the video for an image relating to the target geography profile is based upon at least one type pixel-based "pattern" or "feature" recognition protocol.

The type of scenes and the nature of placement would be different for various screen sizes, location of viewer and even the weather at the time of the viewing. For example, if a viewer is in an office location and using a desktop or a laptop computer, then past internet data of the viewer may indicate that while in a work environment this viewer's response or reaction to online advertising is non-existent or negligible. However, the same viewer may be very responsive on a computer at home especially during certain times of the day. Similarly, such a viewer;s response rate would also escalate when the viewer is interacting on Facebook at home or on mobile. Such viewer data may also show very differing response rate rate on mobile device depending on location i.e. waiting for a flight at the airport, while driving while interacting with friends on Facebook, etc.

As an example, if the viewer is watching a video while walking in a shopping mall and the internet data shows that the viewer is very interested in buying a new pair of sneakers, plus the GPS or other location data indicates that the viewer is or would shortly be passing a NIKE store, then a NIKE advertisement or a product could be placed in an appropriate scene in a video at the right time while the person is walking through the mall and watching a video.

In another embodiment of this invention, the placement of a product image or an advertisement would be done in a manner whereby the placement would look like it was done at the time the original video was produced. This is to preserve the integrity of the video in the viewer's mind and provide authenticity to the placement. When conducting such placement, besides using two dimensional two dimensional overlay blending filters to incorporate new content (as is popularly done in augmented reality systems), this invention would incorporate existing image properties of the video being altered by extrapolating a three dimensional surface pose, recovering a background appearance approximation under frontal perspective view, and adjusting blending of artificial content areas to match the original natural appearance. The new composite image areas would also be translated back into the original perspective, and blended to remain consistent with the original target area. Thus, every pixel of the artificial image appears dynamically adjusted to match the original content (emulating color/brightness/texture gradients, appearance, translucency, etc.), and visual continuity inconsistency caused by conventional methods is suppressed. This method would also apply to three dimensional videos whereby the three-dimensional data (especially depth of field) would be used to not only analyse and evaluate the video content but also place products or advertising in a manner to make it look as part of original video.

Further, in the methods taught herein, the various acts may be performed in a different order than that illustrated and described. Additionally, the methods can omit some acts, and/or employ additional acts. As will be apparent to those skilled in the art, the various embodiments described above can be combined to provide further embodiments. Aspects of the present systems, methods and components can be modified, if necessary, to employ systems, methods, components and concepts to provide yet further embodiments of the invention. For example, the various methods described above may omit some acts, include other acts, and/or execute acts in a different order than set out in the illustrated embodiments.

These and other changes can be made to the present systems, methods and articles in light of the above description. In general, in the following claims, the terms used should not be construed to limit the invention to the specific embodiments disclosed in the specification and the claims, but should be construed to include all possible embodiments along with the full scope of equivalents to which such claims are entitled. Accordingly, the invention is not limited by the disclosure, but instead its scope is to be determined entirely by the following claims.

While certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

We claim:

1. A method to automate post-production content modification, the method comprising:
performing image recognition on a plurality of frames of post-production video content to identify a plurality of objects in a scene by
identifying a first pixel of a selected color relating to a distinctive image for which the frames of post-production video content are being searched,
scanning a number of adjacent pixels, which are adjacent to the first pixel, to determine a shape of an image in each of at least two directions,
determining at least two outermost endpoints of the selected color relative to the first pixel in each of the at least two directions; for each of the outermost end points, determining a respective distance between the first pixel and the respective outermost end point,
determining a ratio of the distance between the outermost end points; and
comparing the determined ratio to a known data for the distinctive image to determine a location of the distinctive image in the frames of the post-production video content, calculating a probability that the distinctive image is present in at least some of the frames of post-production video content based in the ratio and the comparison, and modifying only those frames of the post-production video content where the calculated probability exceeds a confidence level;

determining a context of the scene which at least some of the frames of video represent based at least in part on the objects recognized the frames of the post-production video content;

determining at least one post-production content modification to be made to at least some of the frames of the post-production video content based at least in part on the determined context of the scene which the frames of post-production video content represent; and modifying at least some of the at least one of the frames of the postproduction video content based at least in part on determined at least one post-production content modification.

2. A method to automate post-production content modification, the method comprising:

performing image recognition on a plurality of frames of post-production video content to identify a plurality of objects in a scene by identifying a first pixel of a selected color relating to a distinctive image for which the frames of post-production video content are being searched, scanning a number of adjacent pixels, which are adjacent to the first pixel, to determine a shape of an image in each of at least two directions;

determining at least two outermost endpoints of the selected color relative to the first pixel in each of the at least two directions;

for each of the outermost end points, determining a respective distance between the first pixel and the respective outermost end point;

determining a ratio of the distance between the outermost end points;

comparing the determined ratio to a known data for the distinctive image to determine a location of the distinctive image in the frames of the post-production video content, calculating a first probability that the distinctive image is present in at least some of the frames of post-production video content based in the ratio and the comparison, and comparing a concentration of similar pixels that are similar to the first pixel and a shape of a cluster formed by the concentration of pixels to the set of known data for the distinctive image, calculating a second probability that the distinctive image is present in the frames of post-production video content based on the concentration, shapes of the cluster, and the comparisons, and locating the distinctive image in the at least some frames of post-production video content in response to either of the calculated first probability or the calculated second probability exceeding a confidence level;

determining a context of the scene which at least some of the frames of video represent based at least in part on the objects recognized the frames of the post-production video content;

determining at least one post-production content modification to be made to at least some of the frames of the post-production video content based at least in part on the determined context of the scene which the frames of post-production video content represent; and modifying at least some of the at least one of the frames of the postproduction video content based at least in part on determined at least one post-production content modification.

3. The method of claim 2 wherein performing image recognition on a plurality of frames of post-production video content further includes:

in response to neither of the calculated first probability or the calculated second probability exceeding the confidence level, determining a composite probability; and locating the distinctive image in the at least some frames of postproduction video content in response to the composite probability exceeding the confidence level; and modifying only those frames of the post-production video content where the calculated composite probability exceeds a confidence level.

4. A system to automate post-production content modification, the system comprising:

at least one processor; and at least one nontransitory processor-readable medium which stores at least one of processor-executable instructions or data, the at least one nontransitory processor-readable medium communicatively coupled to the at least one processor, and performing image recognition, by at least one processor, execution of which causes the at least one processor to:

perform image recognition on a plurality of frames of post-production video content to identify a plurality of objects in a scene by identifying a first pixel of a selected color relating to a distinctive image for which the frames of post-production video content are being searched, scanning a number of adjacent pixels, which are adjacent to the first pixel, to determine a shape of an image in each of at least two directions, determining at least two outermost endpoints of the selected color relative to the first pixel in each of the at least two directions, for each of the outermost end points, determining a respective distance between the first pixel and the respective outermost end point, determining a ratio of the distance between the outermost end points, comparing the determined ratio to a known data for the distinctive image to determine a location of the distinctive image in the frames of the post-production video content, calculating a probability that the distinctive image is present in at least some of the frames of post-production video content based in the ratio and the comparison, and modifying only those frames of the post-production video content where the calculated probability exceeds a confidence level;

determine a context of the scene which at least some of the frames of video represent based at least in part on the objects recognized the frames of the postproduction video content;

determine at least one post-production content modification to be made to at least some of the frames of the post-production video content based at least in part on the determined context of the scene which the frames of post-production video content represent; and modify at least some of the at least one of the frames of the postproduction video content based at least in part on determined at least one post-production content modification.

5. A system to automate post-production content modification, the system comprising:
at least one processor; and
at least one nontransitory processor-readable medium which stores at least one of processor-executable instructions or data, the at least one nontransitory processor-readable medium communicatively coupled to the at least one processor, and performing image recognition, by at least one processor, execution of which causes the at least one processor to:
perform image recognition on a plurality of frames of post-production video content to identify a plurality of objects in a scene by
identifying a first pixel of a selected color relating to a distinctive image for which the frames of post-production video content are being searched,
scanning a number of adjacent pixels, which are adjacent to the first pixel, to determine a shape of an image in each of at least two directions,
determining at least two outermost endpoints of the selected color relative to the first pixel in each of the at least two directions,
for each of the outermost end points, determining a respective distance between the first pixel and the respective outermost end point,
determining a ratio of the distance between the outermost end points,
comparing the determined ratio to a known data for the distinctive image to determine a location of the distinctive image in the frames of the post-production video content,
calculating a first probability that the distinctive image is present in at least some of the frames of post-production video content based in the ratio and the comparison,
comparing a concentration of similar pixels that are similar to the first pixel and a shape of a cluster formed by the concentration of pixels to the set of known data for the distinctive image,
calculating a second probability that the distinctive image is present in the frames of post-production video content based on the concentration, shapes of the cluster, and the comparisons, and
locating the distinctive image in the at least some frames of post-production video content in response to either of the calculated first probability or the calculated second probability exceeding a confidence level;
determine a context of the scene which at least some of the frames of video represent based at least in part on the objects recognized the frames of the postproduction video content;
determine at least one post-production content modification to be made to at least some of the frames of the post-production video content based at least in part on the determined context of the scene which the frames of post-production video content represent; and
modify at least some of the at least one of the frames of the postproduction video content based at least in part on determined at least one post-production content modification.

6. The system of claim 5 wherein to perform image recognition on the plurality of frames of post-production video content, the at least one processor further:
in response to neither of the calculated first probability or the calculated second probability exceeding the confidence level, determines a composite probability; and
locates the distinctive image in the at least some frames of post-production video content in response to the composite probability exceeding the confidence level; and
modifies only those frames of the post-production video content where the calculated composite probability exceeds a confidence level.

* * * * *